United States Patent
Kim et al.

(10) Patent No.: US 8,903,093 B2
(45) Date of Patent: Dec. 2, 2014

(54) MOBILE DEVICE, METHOD OF PROCESSING AN INPUT IN A MOBILE DEVICE AND ELECTRONIC PAYMENT METHOD USING A MOBILE DEVICE

(71) Applicants: Won-Tae Kim, Gyeonggi-do (KR);
Do-Jun Rhee, Gyeonggi-do (KR);
Tae-Hoon Kim, Gyeonggi-do (KR);
Hyo-Sun Hwang, Gyeonggi-do (KR)

(72) Inventors: Won-Tae Kim, Gyeonggi-do (KR);
Do-Jun Rhee, Gyeonggi-do (KR);
Tae-Hoon Kim, Gyeonggi-do (KR);
Hyo-Sun Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 56 days.

(21) Appl. No.: 13/705,801

(22) Filed: Dec. 5, 2012

(65) Prior Publication Data

US 2013/0266141 A1 Oct. 10, 2013

(30) Foreign Application Priority Data

Apr. 10, 2012 (KR) .......................... 10-2012-0037328

(51) Int. Cl.
| | | |
|---|---|---|
| H04L 1/00 | (2006.01) | |
| G06Q 20/40 | (2012.01) | |
| G06Q 20/32 | (2012.01) | |
| H04W 12/06 | (2009.01) | |
| H04W 12/02 | (2009.01) | |
| H04W 4/00 | (2009.01) | |

(52) U.S. Cl.
CPC .............. *H04W 12/02* (2013.01); *H04W 4/008* (2013.01); *G06Q 20/40145* (2013.01); *G06Q 20/4014* (2013.01); *G06Q 20/3278* (2013.01); *G06Q 20/3226* (2013.01); *H04W 12/06* (2013.01); *G06Q 20/4012* (2013.01)
USPC .......................................................... 380/270

(58) Field of Classification Search
CPC .................................. G06F 12/14; H04K 1/00
USPC ........................................... 380/270; 713/150
See application file for complete search history.

(56) References Cited

U.S. PATENT DOCUMENTS

| | | |
|---|---|---|
| 7,128,274 B2 | 10/2006 | Kelley et al. |
| 7,280,975 B1 | 10/2007 | Donner |
| 7,314,167 B1 | 1/2008 | Kiliccote |
| 7,383,570 B2 | 6/2008 | Pinkas et al. |
| 7,676,431 B2 | 3/2010 | O'Leary et al. |
| 7,748,618 B2 | 7/2010 | Vawter |
| 7,784,684 B2 | 8/2010 | Labrou et al. |
| 7,828,208 B2 | 11/2010 | Gangi |
| 8,032,457 B2 | 10/2011 | Ostrovsky |
| 8,041,338 B2 | 10/2011 | Chen et al. |
| 8,181,232 B2 | 5/2012 | Grandcolas et al. |
| 8,225,089 B2 | 7/2012 | Wang et al. |

(Continued)

FOREIGN PATENT DOCUMENTS

EP 1276038 A1 * 1/2003 ................ G06F 3/00

*Primary Examiner* — Teshome Hailu
*Assistant Examiner* — Thanh Le
(74) *Attorney, Agent, or Firm* — Myers Bigel Sibley & Sajovec, PA

(57) ABSTRACT

Handheld wireless communications devices include a data input device, which is configured to receive first input data provided by a user, a main processor and a security processor. The security processor includes an input interface and input processing block configured to extract second data from a first portion of the first input data using, for example, a data mapping operation. The security processor also includes an encryption circuit, which is configured generate secure data from the extracted second data by encrypting the extracted second data using an encryption key, and a data/control interface, which is configured to transfer the secure data to the main processor.

19 Claims, 15 Drawing Sheets

(56) References Cited

U.S. PATENT DOCUMENTS

| | | |
|---|---|---|
| 8,225,995 B1 | 7/2012 | Gangi |
| 8,265,600 B2 * | 9/2012 | Baysinger ............... 455/411 |
| 8,295,484 B2 * | 10/2012 | Buer et al. ............... 380/255 |
| 8,315,951 B2 | 11/2012 | Krstulich et al. |
| 8,341,087 B2 * | 12/2012 | Lee ............... 705/65 |
| 8,589,618 B2 * | 11/2013 | Roh et al. ............... 711/103 |
| 2012/0265981 A1 * | 10/2012 | Moon et al. ............... 713/150 |
| 2013/0085941 A1 * | 4/2013 | Rosenblatt et al. ............ 705/44 |

\* cited by examiner

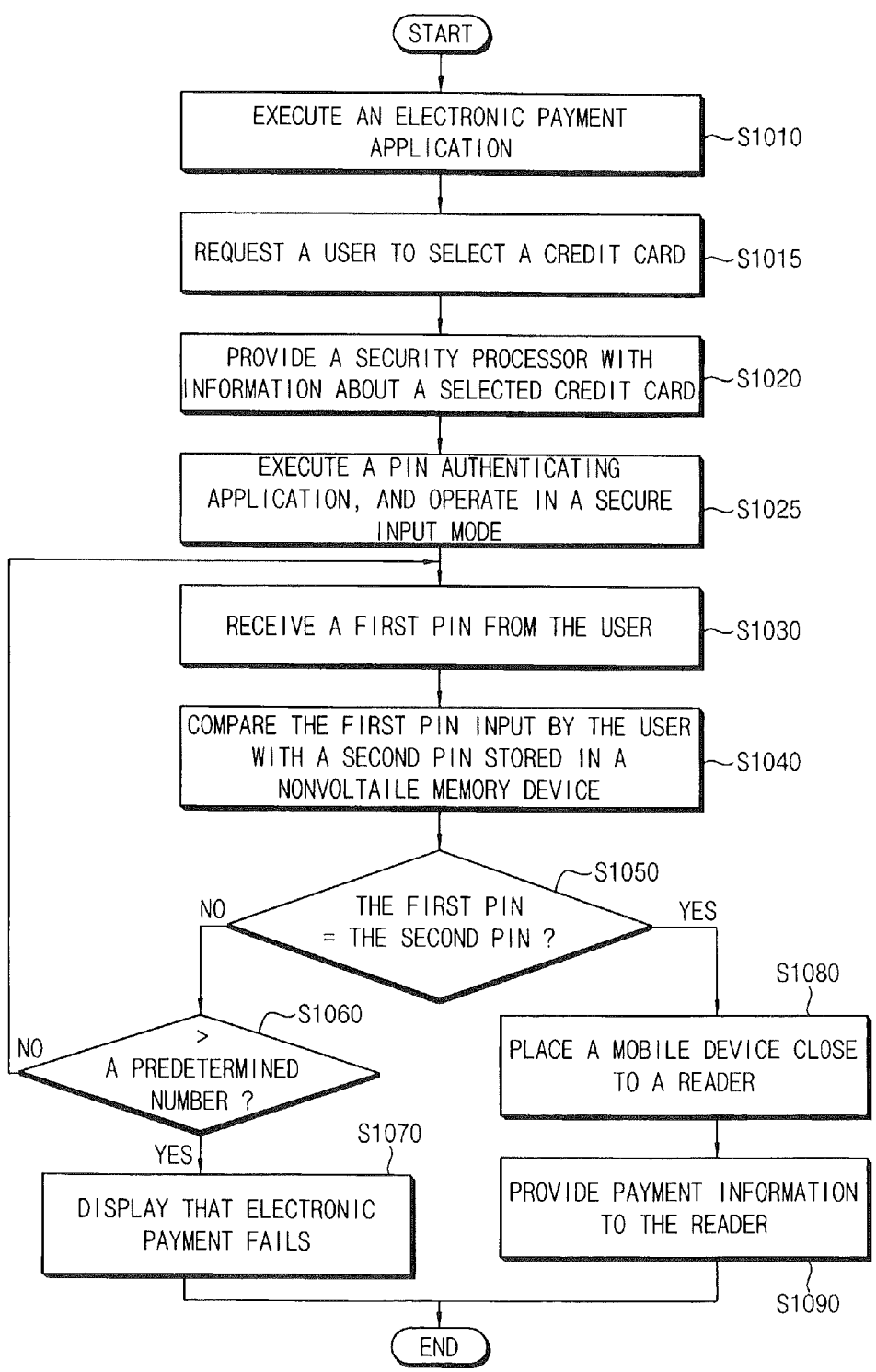

MOBILE DEVICE, METHOD OF PROCESSING AN INPUT IN A MOBILE DEVICE AND ELECTRONIC PAYMENT METHOD USING A MOBILE DEVICE

REFERENCE TO PRIORITY APPLICATION

This application claims priority under 35 USC §119 to Korean Patent Application No. 10-2012-0037328, filed on Apr. 10, 2012, in the Korean Intellectual Property Office (KIPO), the disclosure of which is hereby incorporated herein by reference.

FIELD OF THE INVENTION

The present invention relates to mobile devices and, more particularly, to mobile devices and methods of operating same to process electronic payments securely.

BACKGROUND

A mobile device, such as a smart phone, a tablet computer, or the like, may be prone to hacking, which means that sensitive data, such as private and confidential information, may be leaked from the mobile device. For example, private information may be leaked by a malicious code executed within the mobile device. Further, administrator authority may be exposed to a hacker by rooting or jailbreaking, and the private information and/or applications may be undesirably removed from the mobile device by the hacker. Further, if the mobile device executes an open operating system (OS), the mobile device may be more prone to hacking.

SUMMARY

Handheld wireless communications devices according to embodiments of the invention include a data input device, which is configured to receive first input data provided by a user, a main processor and a security processor. The security processor includes an input interface and input processing block configured to extract second data from a first portion of the first input data using, for example, a data mapping operation. The security processor also includes an encryption circuit, which is configured generate secure data from the extracted second data by encrypting the extracted second data using an encryption key, and a data/control interface, which is configured to transfer the secure data to the main processor.

Additional embodiments of the invention include a controller, which is configured to receive the first input data from the data input device. The input interface and input processing block may also be configured to support bidirectional communication of unencrypted data between the main processor and the controller. In addition, the data mapping operation may include using mapping information derived from a mapping table to determine how the second data is to be extracted from the first portion of the input data.

According to still further embodiments of the invention, the security processor is configured as an application specific integrated circuit (ASIC), which is configured to support a finite set of security functions that cannot be modified by the main processor. The application specific integrated circuit may also include an operating system that cannot be modified by the main processor. The security processor may also be configured to store a security key and the encryption key may be derived from the security key using a key derivation operation.

According to additional embodiments of the invention, the main processor is configured to request authentication of the secure data in response to transferring the secure data to a remote device via a wireless channel. The security processor may also include a nonvolatile memory and the mapping table may be stored in the nonvolatile memory. The security processor may also include a synchronizer, which is configured to provide the touch screen controller with a second clock signal in response to a first clock signal generated by the main processor.

According to further embodiments of the invention, the input interface and input processing block may include an input buffer, which is configured to support a queue of first input data received from the touch screen controller, an information extracting circuit, which is configured to receive the first input data from the input buffer, and a state machine, which is configured to control extraction of the second data from the first input data within the information extracting circuit using operations that are free of control from the main processor. In some of the embodiments of the invention, the extracted second data includes at least one of an internet banking password, a user identification and a personal identification number, and the encryption circuit is configured to support a financial transaction by generating the secure data as an encrypted digital signature containing financial transaction information. The main processor may be configured to seek verification of the financial transaction by transmitting the encrypted digital signature to a remote internet banking server via a wireless channel. The main processor may also be configured to receive a result of the verification of the financial transaction from the wireless channel and pass the result of the verification to the security processor.

According to still further embodiments of the invention, a handheld wireless communications device includes a data input device, which is configured to receive first input data provided by a user, a main processor and a security processor. The security processor may include an input interface and input processing block configured to extract second data from a first portion of the first input data using a data mapping operation. The security processor may also include a nonvolatile memory device, which is configured to store security information, and a processing unit, which is configured to authenticate the first portion of the first input data by comparing the second data to the security information to thereby determine a match therebetween. The security processor may also include a data/control interface, which is configured to provide the main processor with a result of the authentication performed by the processing unit.

A handheld wireless communications device according to additional embodiments of the invention includes a data input device, which is configured to receive first input data provided by a user, and a security processor. The security processor may include an input interface and input processing block configured to extract first personal identification information from a first portion of the first input data. The security processor may also include a nonvolatile memory device, which is configured to store second personal identification information and financial transaction payment information therein. A processing unit may also be provided within the security processor. This processing unit may be configured to authenticate the extracted first personal identification information by comparing the first personal identification information to the second personal identification information to thereby determine a match therebetween. The processing unit may also be configured to transfer the financial transaction payment information to a communication device interface within the device in response to the determination of the match.

According to still further embodiments of the invention, the input interface and input processing block may be configured to extract the first personal identification information from the first portion of the first input data using a data mapping operation and mapping data provided by a mapping table within the security processor. The communication device interface may be configured to convert the financial transaction payment information to a format compatible with transmission or reading by a near field communication (NFC) device. In some embodiments of the invention, the input interface and input processing block may include an input buffer, which is configured to support a queue of the first input data, an information extracting circuit, which is configured to receive the first input data from the input buffer, and a state machine, which is configured to control extraction of the first personal identification information from the first input data within the information extracting circuit.

A handheld wireless communications device according to additional embodiments of the invention may include a data input device, which is configured to receive first data provided by a user, and first and second processors having independent operating systems. The second processor may be configured to support a finite set of operations relating to secure transactions that cannot be modified by operations running on the first processor. This second processor may include an input interface and input processing block configured to extract second data relating to the secure transactions from the first data. The input interface and input processing block may be configured to support bidirectional communication of unencrypted data between the first processor and the data input device. The second processor further includes a data and control interface circuit, which is configured to transfer financial transaction information from the second processor to the first processor. According to additional embodiments of the invention, the second processor may be configured to generate secure data from the extracted second data by encrypting the extracted second data using an encryption key. The second processor may also include a data and control interface circuit, which is configured to transfer the secure data from the second processor to the first processor.

According to additional embodiments of the invention, a security processor for a handheld wireless communications device may include an input interface and input processing block, which is configured to extract second data from first input data provided by a user, an encryption circuit, which is configured generate secure data from the extracted second data by encrypting the extracted second data using an encryption key, and a data/control interface, which is configured to output the secure data in a format compatible for reading by a main processor within the handheld wireless communications device.

A handheld wireless communications device that supports financial transactions may include an energy induction device, a near field communications controller, which is configured to support inductive charging of the energy induction device from an electromagnetic field generated external to the handheld wireless communications device, and a security processor, which is configured to support a financial transaction responsive to data input to the handheld wireless communications device by using the energy induction device to power the near field communications controller and the security processor to transfer financial data between the security processor and a near field communications (NFC) reader wirelessly coupled to the handheld wireless communications device. The near field communications reader may be configured to generate the electromagnetic field during the transfer of the financial data between the security processor and the near field communications reader. In particular, the near field communications reader may be configured to generate the electromagnetic field utilized by the near field communications controller to inductively charge the energy induction device concurrently with the transfer of the financial data between the security processor and the near field communications reader. In some embodiments of the invention, the energy induction device may include a loop antenna.

BRIEF DESCRIPTION OF THE DRAWINGS

Illustrative, non-limiting exemplary embodiments will be more clearly understood from the following detailed description taken in conjunction with the accompanying drawings.

FIG. 12 is a flow chart illustrating an electronic payment method using a mobile device according to example embodiments.

DETAILED DESCRIPTION OF THE EMBODIMENTS

Figure 1:
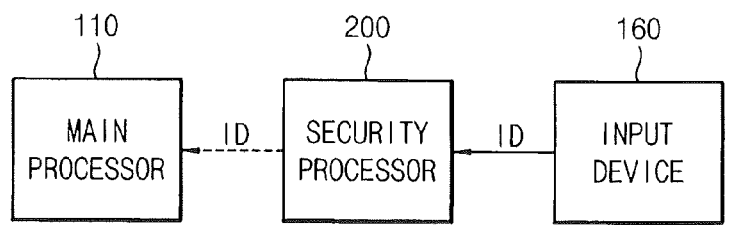
FIG. 1 is a block diagram illustrating a mobile device according to example embodiments.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a mobile device according to example embodiments. Referring to FIG. 1, a mobile device 100 includes a main processor 110, an input device 160 and a security processor 200. The main processor 110 may execute an operating system (OS) to operate the mobile device 100. The main processor 110 may further execute various applications, such as internet browser applications, game applications, video player applications and other applications. In some example embodiments of the inventive concept, the main processor 110 may be an application processor (AP), a mobile processor, or a related processor. The input device 160 may receive an input of a user, and may generate input data ID corresponding to the input of the user. In some example embodiments of the inventive concept, the input device 160 may include a touch screen, a key pad, a button, a fingerprint device, a keyboard, a mouse, or another conventional data input device. For example, the input device 160 may include the touch screen formed in a display device, and a touch controller for controlling the touch screen. The security processor 200 may be coupled between the main processor 110 and the input device 160. The security processor 200 may be tamper-resistant against tampering attacks, such as micro-probing, a software attack, eavesdropping, a fault generation attack, etc. For example, the security processor 200 may include a fault detector, a power glitch detector, a laser detector, an abnormal condition detector, a reset detector, a metal shield, a data path encryption, a true random number generator, etc. In some example embodiments of the inventive concept, the main processor 110 and the security processor 200 may be implemented as separate integrated circuits or chips. In other example embodiments of the inventive concept, the security processor 200 may be built in the main processor 110 as a processing block.

The security processor 200 may receive the input data (ID) from the input device 160, and may selectively provide the input data ID to the main processor 110 according to an input mode of the mobile device 100. In a normal input mode, the security processor 200 may provide the input data ID to the main processor 110 so that the main processor 110 processes the input data ID. In a secure input mode, the security processor 200 may not provide the input data ID to the main processor 110, and may process the input data ID by itself. The security processor 200 may extract input information from the input data ID using a mapping table in the secure input mode. In some example embodiments of the inventive concept, the security processor 200 may encrypt the input information, and may provide the encrypted input information to the main processor 110. In other example embodiments of the inventive concept, the security processor 200 may perform authentication for the input of the user by comparing the input information with security information stored in the security processor 200. Since the security processor 200 selectively provides the input data ID from the input device 160 to the main processor 110, the input of the user may be secured even if the main processor 110 is hacked.

In some example embodiments of the inventive concept, a normal application may be executed by the main processor 110, and a security application may be executed by the security processor 200. Here, the security application may be an application receiving, processing or storing sensitive data that should be secured. Since the security processor 200 executes the security application, the sensitive data may be secured even if the main processor 110 is hacked. The security processor 200 may include an encryption/decryption block, such as a cryptographic module. The security processor 200 may receive data from the main processor 110, and may encrypt the received data using the encryption/decryption block. The data encrypted by the encryption/decryption block may be stored in an external memory device via the main processor 110, may be stored in a memory device included in the security processor 200, or may be stored in a memory device coupled to the security processor 200. Since the security processor 200 encrypts data and stores the encrypted data in an external or internal memory device, the data may be secured.

The main processor 110 may be susceptible to hacking or other security breach. For example, a malicious code, such as a virus, a worm, a trojan, spyware, etc., may be executed in the main processor 110, and the malicious code may take private information from the user by intercepting the input data ID transferred from the input device 160 to the main processor 110. However, in the mobile device 100 according to example embodiments of the inventive concept, the security processor 200 may be coupled between the main processor 110 and the input device 160, and the security processor 200 may selectively provide the input data ID from the input device ID to the main processor 200, thereby securing the input of the user. This selective provision of the input data ID to the main processor 110 may be referred to as a "Secure User Input" function of the security processor 200.

Furthermore, in a typical mobile device, administrator authority of the main processor 110 may be exposed to a hacker by rooting or jailbreaking, and a security application may be forged, falsified or undesirably deleted. However, in the mobile device 100 according to example embodiments of the inventive concept, the security processor 200 may store and/or execute the security application, thereby securing the security application. This execution of the security application may be referred to as a "Secure Execution" function of the security processor 200. In addition, in the typical mobile device, the main processor 110 may be hacked by a malicious code, rooting, jailbreaking, etc., so that sensitive data, such as private information of a user, may be leaked. However, in the mobile device 100, the security processor 200 may encrypt the sensitive data, and may store the encrypted sensitive data, thereby securing the sensitive data. This encryption and/or storage of the sensitive data may be referred to as a "Secure Storage" function of the security processor 200. The mobile device 100 may be any mobile device, such as a mobile phone, a smart phone, a tablet computer, a laptop computer, a personal digital assistant (PDA), a portable multimedia player (PMP), a digital camera, a music player, a portable gate console, a navigation system, etc.

Figure 2:
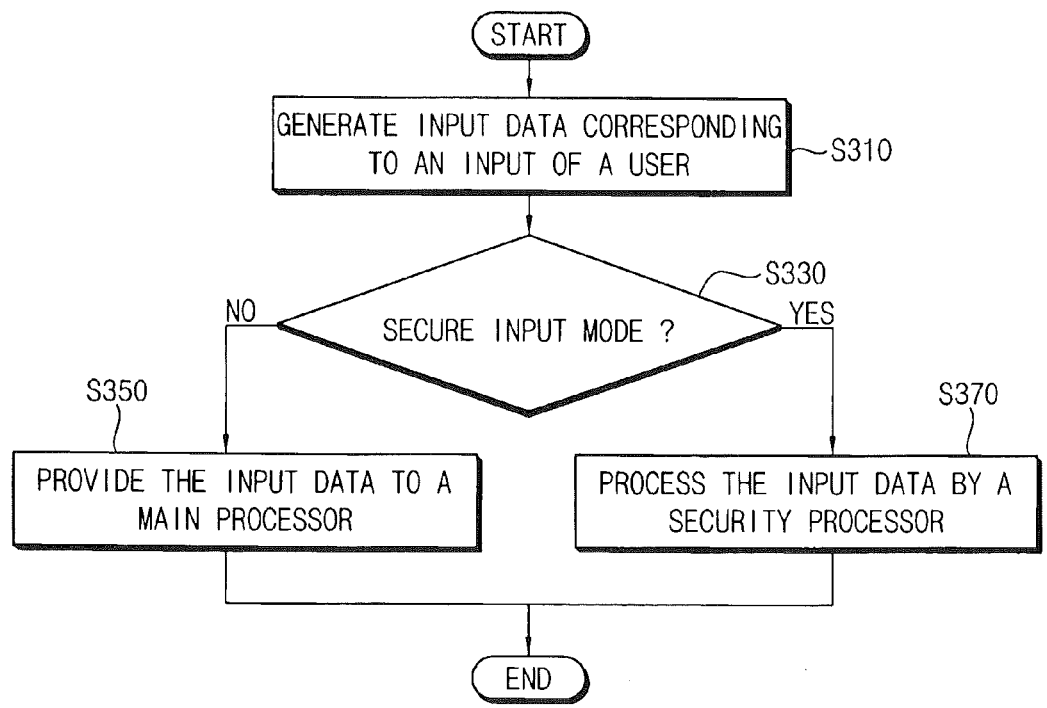
FIG. 2 is a flow chart illustrating a method of processing an input in a mobile device according to example embodiments.

FIG. 2 is a flow chart illustrating a method of processing input data in a mobile device according to example embodiments of the inventive concept. Referring to FIGS. 1 and 2, an input device 160 may receive an input of a user, and may generate input data ID corresponding to the input of the user (S310). For example, the input data ID may include coordinate information about at least one touched point on a touch screen, information about a pressed key of a keypad, information about a pressed button, fingerprint information sensed by a fingerprint device, information about a pressed key of a keyboard, information about a movement or a click of a mouse, or the like. A security processor 200 may receive the input data ID from the input device 160. The security processor 200 may determine whether an input mode of the mobile device 100 is a normal input mode or a secure input mode (S330). The main processor 110 may inform the security processor 200 of the input mode. For example, the main processor 110 may transmit an input mode signal indicating whether the input mode is the normal input mode or the secure input mode, and the security processor 200 may determine the input mode based on the input mode signal from the main processor 110. In another example, an application executed by the security processor 200 may determine whether data that needs to be secured is to be input, and may inform the security processor 200 of the start and/or end of the secure input mode. In still other example embodiments of the inventive concept, the security processor 200 may detect the press of a particular button on the mobile device 100, and may determine the start and/or end of the secure input mode based on the state of the particular button. In still other example embodiments, the user may wave the mobile device 100 or may turn the mobile device 100 upside down, and the security processor 200 may sense such a movement of the mobile device 100 using a sensor, such as a gyro sensor. The security processor 200 may determine the start and/or end of the secure input mode according to the movement of the mobile device 100.

If the input mode is the normal input mode (S330: NO), the security processor 200 may provide the input data ID from the input device 160 to the main processor 110 (S350). The main processor 110 may receive the input data ID from the security processor 200, and may process the received input data ID. For example, the input data ID may include coordinate information about at least one touched point on a touch screen, and the main processor 110 may provide the coordinate information to an application executed by the main processor 110. The executed application may perform subsequent processes based on the coordinate information.

However, if the input mode is the secure input mode (S330: YES), the security processor 200 may not provide the input data ID directly to the main processor 110. Instead, the security processor 200 may provide the main processor 110 with predetermined data having a predetermined value instead of the input data ID. In other example embodiments of the inventive concept, the security processor 200 may provide the main processor 110 with no input. In still other example embodiments of the inventive concept, after the security processor 200 processes the input data ID, the security processor 200 may provide the main processor 110 with one or more results from the processed data. Furthermore, if the input mode is the secure input mode (S330: YES), the security processor 200 may process the input data ID by itself (S370). For example, the security processor 200 may convert the input data ID including the coordinate information into input information including a number, a character and/or a symbol using a mapping table storing mapping information. In some example embodiments, the security processor 200 may encrypt the input information, and may provide the encrypted input information to the main processor 110. In other example embodiments, the security processor 200 may perform authentication for the input of the user by comparing the input information with security information stored in the security processor 200.

As described above, in the method of processing the input in the mobile device 100 according to example embodiments, the security processor 200 may selectively provide the input data ID from the input device 160 to the main processor 110 according to the input mode, thereby securing the input of the user.

Figure 3:
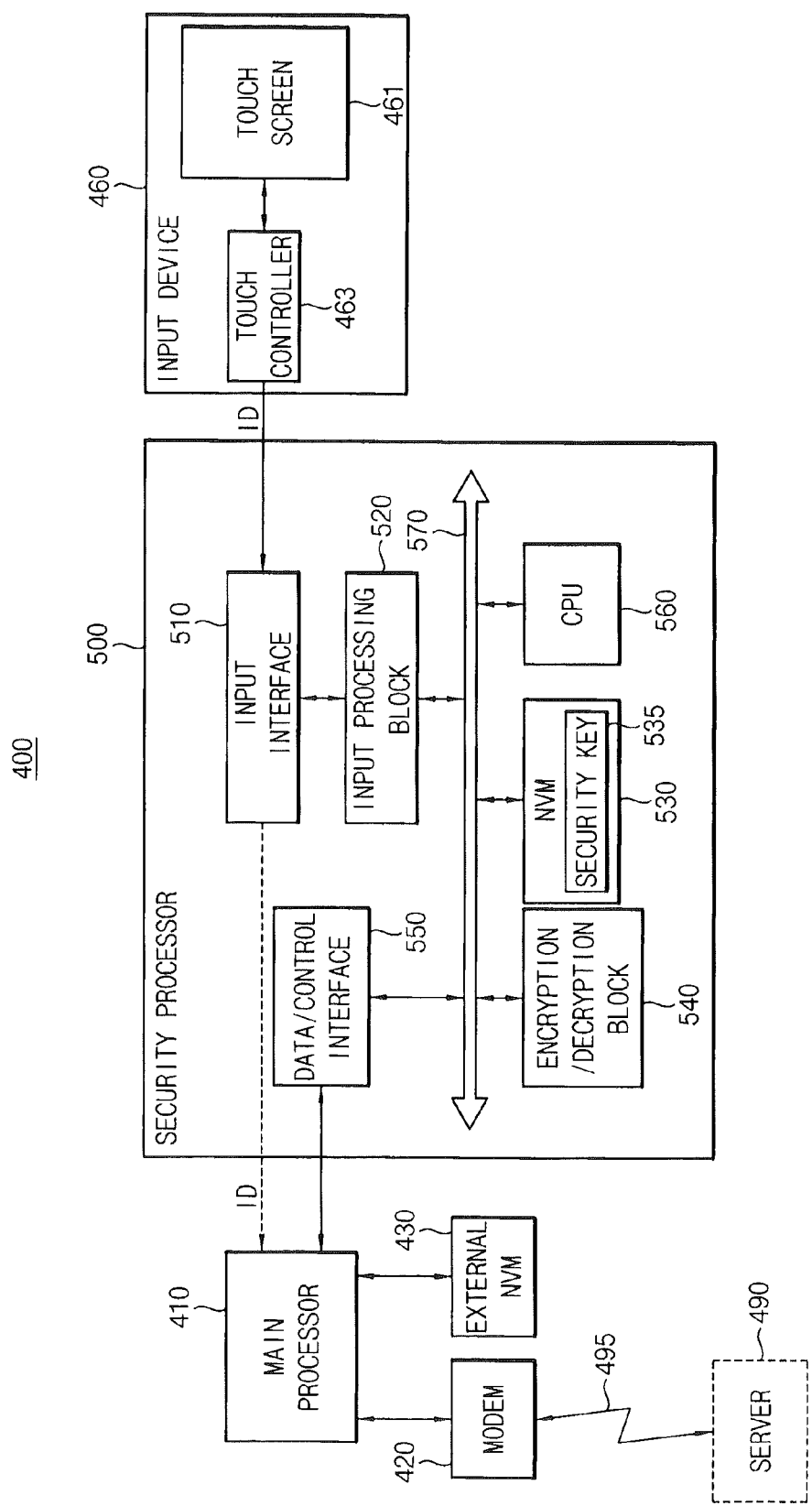
FIG. 3 is a block diagram illustrating a mobile device according to example embodiments.

FIG. 3 is a block diagram illustrating a mobile device according to example embodiments of the inventive concept. Referring to FIG. 3, a mobile device 400 includes a main processor 410, a modem 420, an external nonvolatile memory device 430, an input device 460 and a security processor 500. The main processor 410 may execute an OS for operating the mobile device 400 and various applications. The main processor 410 may be coupled to the modem 420 and the external nonvolatile memory device 430. The modem 420 may communicate with a remote server 490 through a wired or wireless communication channel 495. For example, the modem 420 may provide wired or wireless communication, such as wireless internet, wireless fidelity (Wi-Fi), global positioning system (GPS), Bluetooth (BT), global system for mobile communication (GSM), general packet radio system (GPRS), wideband code division multiple access (WCDMA), high speed uplink/downlink packet access (HSxPA), etc. In some example embodiments of the inventive concept, the main processor 410 and the modem 420 may be implemented as one chip. Alternatively, the main processor 410 and the modem 420 may be implemented as separate chips.

The external nonvolatile memory device 430 may store an application to be executed by the main processor 410 and/or data to be processed by the main processor 410. For example, the external nonvolatile memory device 430 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The input device 460 may receive an input of a user, and may generate input data ID corresponding to the input of the user. The input device 460 may include a touch screen 461 formed in a display device and a touch controller 463 for controlling the touch screen 461. The touch controller 463 may generate the input data ID including coordinate information about at least one touched point on the touch screen 461 by driving the touch screen 461. The security processor 500 may be coupled between the main processor 410 and the input device 460. The security processor 500 may receive the input data ID from the input device 460, and may selectively provide the input data ID to the main processor 410 according to an input mode of the mobile device 400.

The security processor 500 may include an input interface 510, an input processing block 520, a nonvolatile memory device 530, an encryption/decryption block 540, a data/control interface 550, a central processing unit (CPU) 560 and a bus 570. The input interface 510 may be coupled between the input device 460 and the main processor 410. The input interface 510 may receive the input data ID from the input device 460. The input interface 510 may selectively output the input data ID to the main processor 410 according to whether the input mode is a normal input mode or a secure input mode. The input processing block 520 may receive the input data ID from the input device 460 via the input interface 510. The input processing block 520 may extract input information from the input data ID using a mapping table storing mapping information. For example, the mapping information stored in the mapping table may include a number, a character or a symbol corresponding to each point of the touch screen 461. The nonvolatile memory device 530 included in the security processor 500 may store the mapping information, and the mapping information may be loaded from the nonvolatile memory device 530 into the mapping table. Alternatively, when a particular application is executed, the mapping table corresponding to the particular application may be loaded from the main processor 410 or from a memory device coupled to the main processor 410 into the mapping table via the data/control interface 550. The nonvolatile memory device 530 may be protected against hacking, such as a tampering attack, and may store data, a code, a key, an application and/or information that needs to be secured. For example, the nonvolatile memory device 530 may store a security key 535, which may be protected against hacking.

The encryption/decryption block 540 may encrypt and/or decrypt data. The encryption/decryption block 540 may encrypt the input information extracted by the input processing block 520 using the security key 535 stored in the nonvolatile memory device 530. To encrypt the input information, the encryption/decryption block 540 may use the security key 535 as it is, or may use a key derived from the security key 535 using a key derivation function (KDF). The data/control interface 550 may receive data and/or a control signal from the main processor 410, and may transmit the data and/or the control signal to the main processor 410. The data/control interface 550 may include a data interface for transferring the data between the main processor 410 and the security processor 500, and a control interface for transferring the control signal between the main processor 410 and the security processor 500. For example, the data interface may be a high-speed interface for rapidly transferring large quantities of data. The security processor 500 may receive an input mode signal indicating the normal input mode or the secure input mode from the main processor 410 via the data/control interface 550, and may determine the start and/or end of the secure input mode based on the input mode signal. Furthermore, the security processor 500 may provide the encrypted input information that is encrypted by the encryption/decryption block 540 to the main processor 410 via the data/control interface 550.

The CPU 560 may be coupled to the input processing block 520, the nonvolatile memory device 530, the encryption/decryption block 540 and the data/control interface 550 via the bus 570. The CPU 560 may control the input processing block 520, the nonvolatile memory device 530, the encryption/decryption block 540 and the data/control interface 550. The CPU 560 may execute an OS for operating the security processor 500. The OS executed by the CPU 560 of the security processor 500 may be smaller in size than the OS executed in the main processor 410. Moreover, the CPU 560 may execute a security application processing data that needs to be secured.

For example, if the main processor 410 transmits the input mode signal indicating the secure input mode to the data/control interface 550, or if the security application executed by the CPU 560 determines that data which needs to be secured is to be input by the user, the security processor 500 may operate in the secure input mode. In the secure input mode, the input interface 510 may not provide the main processor 410 with the input data ID received from the input device 460. The input processing block 520 may convert the input data ID received via the input interface 510 into a string of numbers, characters and/or symbols as the input information. The encryption/decryption block 540 may encrypt the input information using the security key 535 stored in the nonvolatile memory device 530. The input information encrypted by the encryption/decryption block 540 may be provided to the main processor 410 via the data/control interface 550.

The main processor 410 may receive the encrypted input information from the data/control interface 550 and may store the encrypted input information in the external nonvolatile memory device 430. Alternatively, the main processor 410 may transfer the encrypted input information to the remote sever 490 via the modem 420. For example, the remote server 490 may authenticate the encrypted input information, and may transfer a result of the authentication through the communication channel 495. If the main processor 410 receives the result of the authentication via the modem 420, the main processor 410 may provide the result of the authentication to the security processor 500, and the security processor 500 may receive the result of the authentication via the data/control interface 550. Thus, as described above, the security processor 500 may selectively provide the input data ID from the input device 460 to the main processor 410, and may provide the encrypted input information to the main processor 410 by encrypting the input information extracted from the input data ID, thereby securing the input of the user.

Figure 4:
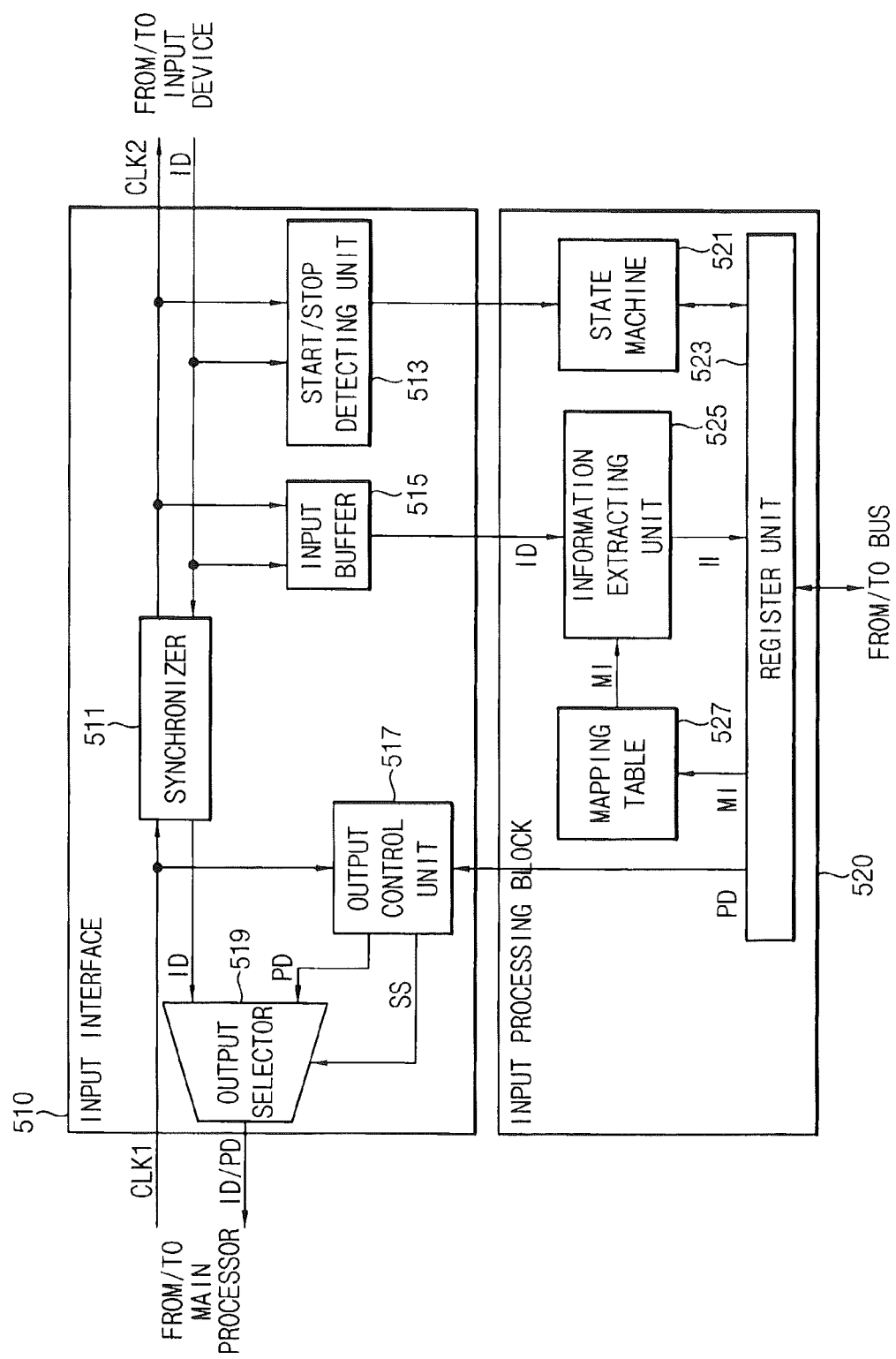
FIG. 4 is a block diagram illustrating an example of an input interface and an input processing block included in a mobile device of FIG. 3.

FIG. 4 is a block diagram illustrating an example of an input interface and an input processing block included in a mobile device of FIG. 3. Referring to FIGS. 3 and 4, an input interface 510 may include a synchronizer 511, a start/stop detecting unit 513, an input buffer 515, an output control unit 517 and an output selector 519. An input processing block 520 may include a state machine 521, a register unit 523, an information extracting unit 525 and a mapping table 527. The synchronizer 511 may receive a first clock signal CLK1 from a main processor 410, and may transmit a second clock signal CLK2 to an input device 460. The first clock signal CLK1 and the second clock signal CLK2 may have substantially the same frequency, and the synchronizer 511 may transmit the first clock signal CLK1 as the second clock signal CLK2 to the input device 460. Alternatively, the first clock signal CLK1 and the second clock signal CLK2 may have different frequencies, and the synchronizer 511 may generate the second clock signal CLK2 based on the first clock signal CLK1. The synchronizer 511 may adjust an output timing of the input data ID to the main processor 410 such that a predetermined phase difference is maintained between the input data ID provided to the main processor 410 and the first clock signal CLK1 received from the main processor 410. Although FIG. 4 illustrates an example where the input data ID and the clock signals CLK1 and CLK2 are transferred between the input interface 510 and the input device 460 and between the input interface 510 and the main processor 410, in other embodiments of the inventive concept only the input data ID may be transferred between the input interface 510 and the input device 460 and between the input interface 510 and the main processor 410. In still further embodiments of the inventive concept, the synchronizer 511 may not be included.

The start/stop detecting unit 513 may detect an input start time when the input device 460 starts to output the input data ID and an input stop time when the input device 460 stops to output the input data ID. The start/stop detecting unit 513 may provide information about the input start time and/or the input stop time to the state machine 521 of the input processing block 520. The input buffer 515 may temporarily store the input data ID received from the input device 515. For example, the input buffer 515 may sample the input data ID in response to the second clock signal CLK2. The input buffer 515 may include a first-in first-out (FIFO) memory device that supports a queue. The FIFO queue may sequentially store the input data ID, and may sequentially output the input data ID to the input processing block 520.

The output control unit 517 may control the output selector 519. The output control unit 517 may generate a selection signal SS having different logic levels according to an input mode. For example, the output control unit 517 may generate the selection signal SS having a first logic level in a normal input mode, and may generate the selection signal SS having a second logic level in a secure input mode.

The output selector 519 may receive the input data ID from the input device 460 via the synchronizer 511, and may selectively output the input data ID to the main processor 410 in response to the selection signal SS. For example, the output selector 519 may output the input data ID to the main processor 410 when the selection signal SS has the first logic level, and may block output of the input data ID to the main processor 410 when the selection signal SS has the second logic level. In some example embodiments of the inventive concept, when the selection signal SS has the second logic level (i.e., in the secure input mode), the output selector 519 may output predetermined data PD having a predetermined value instead of the input data ID. For example, the register unit 523 of the input processing block 520 may store the predetermined data PD of a fixed value, and the output control unit 517 may provide the predetermined data PD stored in the register unit 523 as an input signal to the output selector 519. The output selector 519 may selectively output the input data ID or the predetermined data PD in response to the selection signal SS. When the selection signal SS has the second logic level, the output selector 519 may block output of the input data ID and the predetermined data PD to the main processor 410.

Referring still to FIG. 4, the state machine 521 may determine an operating state of the input processing block 520, and may control an operation of the input processing block 520. For example, the state machine 521 may write a predetermined value to a particular register included in the register unit 523 to control the operation of the input processing block 520. The state machine 521 may receive the information about the input start time and/or the input stop time from the start/stop detecting unit 513, and may control an operation of the input extracting unit 525 based on the received information. For example, the state machine 521 may control the operation of the input extracting unit 525 by writing a predetermined value to a particular register or by transmitting a control signal to the input extracting unit 525. The input extracting unit 525 may receive the input data ID from the input device 460 via the input buffer 515. The input extracting unit 525 may extract input information II from the input data ID using the mapping table 527 storing mapping information MI. The mapping information MI stored in the mapping table 527 may include a number, a character or a symbol corresponding to each point of the touch screen 461. The input extracting unit 525 may convert the input data ID about at least one touched point on the touch screen 461 into a string of numbers, characters or symbols as the input information II. Alternatively, the mapping information MI may include a dot corresponding to each point of the touch screen 461, and the input extracting unit 525 may convert the input data ID about at least one touched point on the touch screen 461 into a pattern of connected dots as the input information II.

In some example embodiments of the inventive concept, the mapping information MI may be loaded into the mapping table 527 when the security processor 500 is initialized or when an operating state of the security processor 500 is changed. In other example embodiments, the mapping information MI corresponding to a currently executed application may be loaded into the mapping table 527 during runtime. Furthermore, in some example embodiments, the mapping information MI may be loaded from the nonvolatile memory device 530 into the mapping table 527 via the register unit 523. In other example embodiments of the inventive concept, the mapping information MI may be loaded from the main processor 410 into the mapping table 527 via the data/control interface 550 and the register unit 523.

The register unit 523 may be accessed by the CPU 523. The register unit 523 may include special function registers for checking and controlling the operating state of the input processing block 520. The input information II extracted by the input extracting unit 525 may be stored in the register unit 523. In some example embodiments of the inventive concept, the input information II stored in the register unit 523 may be encrypted by the encryption/decryption unit 540. The encrypted input information II may be provided to the main processor 410 via the data/control interface 550. In other example embodiments, the input information II stored in the register unit 523 may be compared with security information stored in the nonvolatile memory device 530 to authenticate an input of a user.

Figure 5:
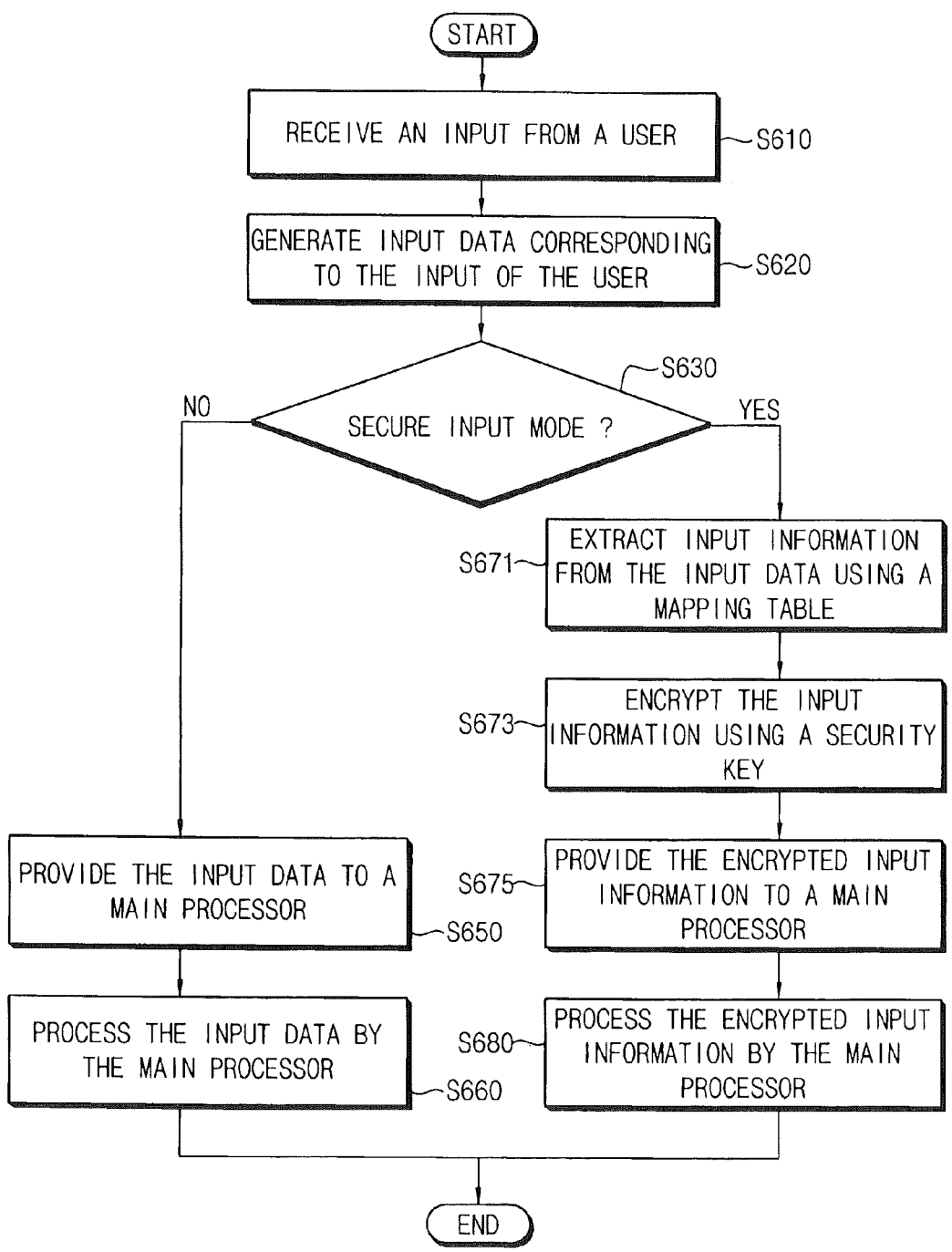
FIG. 5 is a flow chart illustrating a method of processing an input in a mobile device according to example embodiments.

FIG. 5 is a flow chart illustrating a method of processing an input in a mobile device according to example embodiments. Referring to FIGS. 3-5, an input device 460 may receive an input from a user (S610), and may generate input data ID corresponding to the input of the user (S620). For example, the touch controller 463 may generate the input data ID including coordinate information about at least one touched point on a touch screen 461. An input interface 510 of a security processor 500 may receive the input data ID from the input device 460. The input interface 510 may selectively output the input data ID to a main processor 410 according to an input mode of a mobile device 400. The main processor 410 may provide an input mode signal indicating a normal input mode or a secure input mode to the security processor 500. The security processor 500 may receive the input mode signal via a data/control interface 550, and may write the received input mode signal to a register unit 523 of an input processing block 520. An output control unit 517 of the input interface 510 may generate a selection signal SS for controlling an output selector 519 based on the input mode signal stored in the register unit 523. An application executed by a CPU 560 of the security processor 500 may determine the start and/or end of the secure input mode, and may write information about the input mode to the register unit 523. In still other example embodiments, the security processor 500 may determine the start and/or end of the secure input mode by detecting the press of a particular button or by sensing a movement of the mobile device 400, and may write the information about the input mode to the register unit 523.

If the input mode is the normal input mode (S630: NO), the input interface 510 may output the input data ID to the main processor 410 (S650). For example, the register unit 523 may store information indicating the normal input mode, and the output control unit 517 of the input interface 510 may output a selection signal SS having a first logic level corresponding to the normal input mode based on the information indicating the normal input mode. The output selector 519 may output the input data ID in response to the selection signal SS having the first logic level. The main processor 410 may process the input data ID received from the input interface 510 (S660). For example, the main processor 410 may provide the input data ID to an application executed by the main processor 410. The executed application may perform subsequent processes based on the input data ID.

On the other hand, if the input mode is the secure input mode (S630: YES), the input processing block 520 may extract input information II from the input data ID using a mapping table 527 (S671). For example, an information extracting unit 525 of the input processing block 520 may convert the input data ID received from the input device 460 via an input buffer 515 into the input information II based on mapping information stored in the mapping table 527. For example, the information extracting unit 525 may extract a string of numbers, characters or symbols or a pattern of connected dots as the input information II from the input data ID about at least one touched point on the touch screen 461. The input information II extracted by the information extracting unit 525 may be stored in the register unit 523.

An encryption/decryption block 540 may encrypt the input information II stored in the register unit 523 using a security key 535 stored in a nonvolatile memory device 530 (S673). For example, the input information II encrypted using the security key 535 may be decrypted by a secret key stored in a remote server 490. In other examples, the input information II encrypted using the security key 535 may be decrypted by the security key 535 or another secret key stored in the nonvolatile memory device 530. In still other examples, a digital signature may be generated based on the input information II stored in the register unit 520 and the security key 535 stored in the nonvolatile memory device 530, and the digital signature may be verified by the remote server 490.

The security processor 500 may provide the input information II encrypted by the encryption/decryption block 540 to the main processor 410 via the data/control interface 550 (S675), and the main processor 410 may process the encrypted input information II received from the data/control interface 550 (S680). For example, the main processor 410 may store the encrypted input information II in an external nonvolatile memory device 430. Thereafter, the security processor 500 may request the main processor 410 to provide the encrypted input information II via the data/control interface 550, and the main processor 410 may provide the encrypted input information II stored in the external nonvolatile memory device 430 to the security processor 500. The security processor 500 may receive the encrypted input information II from the main processor 410 via the data/control interface 550, and may obtain the original input information II by decrypting the encrypted input information II using the encryption/decryption block 540. In other example embodiments of the inventive concept, the main processor 410 may provide the encrypted input information II to the modem 420, and the modem 420 may transmit the encrypted input information II to the remote sever 490 through a communication channel 495. The remote sever 490 may authenticate the encrypted input information II. For example, the remote sever 490 may obtain the original input information II by decrypting the encrypted input information II using a secret key corresponding to the security key 535, and may perform authentication for the original input information II. The remote sever 490 may transmit a result of the authentication to the modem 420 through the communication channel 495, and the main processor 410 may provide the result of the authentication received via the modem 420 to the data/control interface 550 of the security processor 500. As described above, during the secure input mode, the method of processing the input in the mobile device 400 according to example embodiments may not provide the input data ID to the main processor 410, and may provide the main processor 410 with the encrypted input information II that is encrypted using the security key 535, thereby securing the input of the user.

Figure 6:
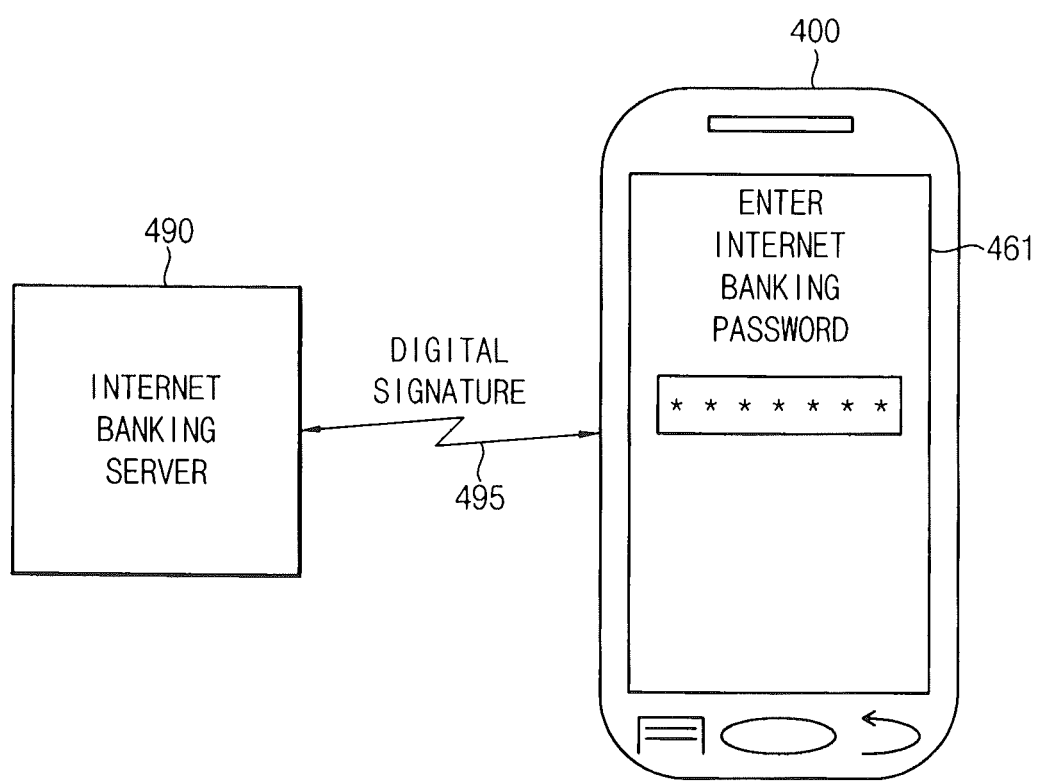
FIG. 6 is a diagram for describing an example of an input processing method of a mobile device of FIG. 3.

FIG. 6 is a diagram for describing an example of an input processing method of a mobile device of FIG. 3. Referring to FIGS. 3 and 6, a mobile device 400 may execute an internet banking application. In some example embodiments, the Internet banking application may be executed by a CPU 560 of a security processor 500. In other example embodiments, a portion of program codes of the internet banking application may be executed by a main processor 410, and the remaining codes of the internet banking application may be executed by the CPU 560 of the security processor 500. For example, a code (or an applet) for receiving an internet banking password that is input by a user, a code (or an applet) for performing an internet banking payment, or the like, may be executed by the CPU 560 of the security processor 500. If the internet banking application or the code for receiving the internet banking password is executed, the mobile device 400 may operate in a secure input mode. The internet banking application may control a display device of the mobile device 400 to display an image requesting the user to enter the internet banking password. If the image requesting the user to enter the internet banking password is displayed, the user may touch a touch screen 461 to input the internet banking password. A touch controller 463 may sense the touch of the user, and may generate input data ID corresponding to the touch of the user. An input interface 510 may receive the input data ID from the touch controller 463, and may block the input data ID from the main processor 410 in the secure input mode. An input processing block 520 may receive the input data ID from the touch controller 463 via the input interface 510, and may extract the internet banking password as input information from the input data ID using a mapping table. An encryption/decryption block 540 may generate a digital signature based on the internet banking password extracted by the input processing block 520 and a security key 535 stored in a nonvolatile memory device 530. The digital signature may include internet banking payment information.

The security processor 500 may provide the digital signature generated by the encryption/decryption block 540 to the main processor 410 via a data/control interface 550. The main processor 410 may transmit the digital signature to an internet banking server 490 through a modem 420 and a communication channel 495. The internet banking server 490 may verify the digital signature received through the communication channel 495, and may perform an internet banking payment in case of success of the verification. The internet banking server 490 may transmit a result of the verification and/or a result of the internet banking payment to the modem 420 through the communication channel 495. The main processor 410 may provide the result of the verification and/or the result of the internet banking payment to the data/control interface 550, or may control the display device to display the result of the verification and/or the result of the internet banking payment. As described above, the security processor 500 may process the internet banking password that is input by the user, thereby securing the internet banking password.

Figure 7:
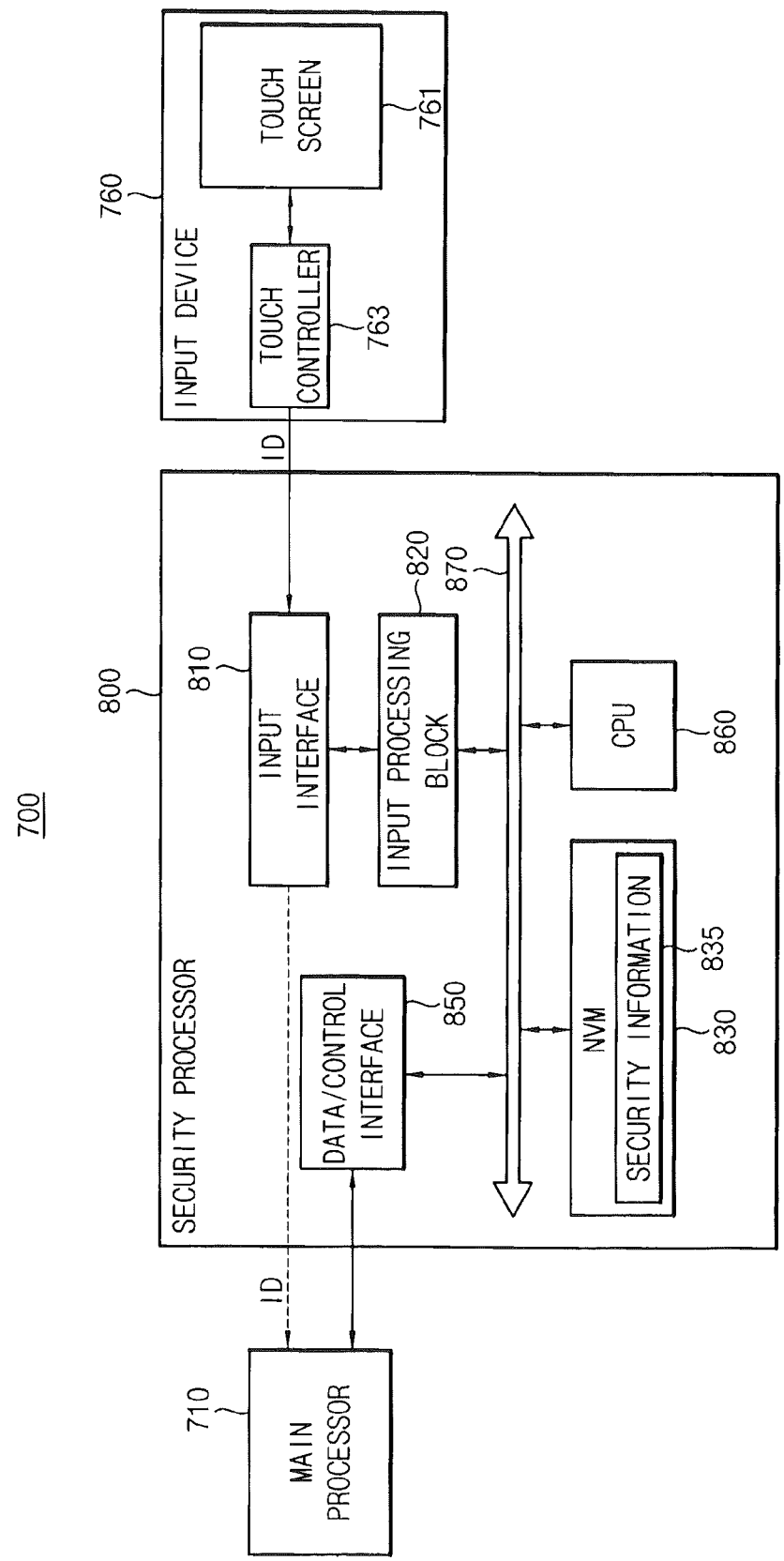
FIG. 7 is a block diagram illustrating a mobile device according to example embodiments.

FIG. 7 is a block diagram illustrating a mobile device according to example embodiments. Referring to FIG. 7, a mobile device 700 includes a main processor 710, an input device 760 and a security processor 800. The main processor 710 may execute an OS for operating the mobile device 700 and various applications. The input device 760 may receive an input of a user, and may generate input data ID corresponding to the input of the user. In some example embodiments, the input device 760 may include a touch screen 761 formed in a display device and a touch controller 763 for controlling the touch screen 761. The touch controller 763 may generate the input data ID including coordinate information about at least one touched point on the touch screen 761 by driving the touch screen 761. The security processor 800 may be coupled between the main processor 710 and the input device 760. The security processor 800 may receive the input data ID from the input device 760, and may selectively provide the input data ID to the main processor 710 according to an input mode of the mobile device 700.

The security processor 800 may include an input interface 810, an input processing block 820, a nonvolatile memory device 830, a data/control interface 850, a CPU 860 and a bus 870. The input interface 810 may be coupled between the input device 760 and the main processor 710. The input interface 810 may receive the input data ID from the input device 760. The input interface 810 may selectively output the input data ID to the main processor 710 according to whether the input mode is a normal input mode or a secure input mode. The input processing block 820 may receive the input data ID from the input device 760 via the input interface 810. The input processing block 820 may extract input information from the input data ID using a mapping table storing mapping information. For example, the mapping information stored in the mapping table may include a number, a character or a symbol corresponding to each point of the touch screen 761. The mapping information may be loaded from the nonvolatile memory device 830 into the mapping table, or may be loaded from the main processor 710 or from a memory device coupled to the main processor 710 into the mapping table. For example, the input information extracted by the input processing block 820 may include a string of numbers, characters or symbols, or a pattern of dots that the user connects. The nonvolatile memory device 830 may be protected against hacking, such as a tampering attack, and may store data, a code, a key, an application and/or information that need to be secured. The nonvolatile memory device 830 may store security information 835, which may be protected against hacking. For example, the security information 835 may include a password or a passcode of the user, a personal identification number (PIN), a screen unlock pattern, etc. The security information 835 may be compared with the input information extracted by the input processing block 820 to perform authentication for the input of the user. The data/control interface 850 may receive data and/or a control signal from the main processor 710, and may transmit the data and/or the control signal to the main processor 710. In some example embodiments, the security processor 800 may receive an input mode signal indicating the normal input mode or the secure input mode from the main processor 710 via the data/control interface 550, and may determine the start and/or end of the secure input mode based on the input mode signal. Further, the security processor 800 may provide a result of the authentication for the input of the user to the main processor 710 via the data/control interface 850. The CPU 860 may be coupled to the input processing block 820, the nonvolatile memory device 830 and the data/control interface 850 via the bus 870. The CPU 860 may control the input processing block 820, the nonvolatile memory device 830 and the data/control interface 850. The CPU 860 may execute an OS for operating the security processor 800. The OS executed by the CPU 860 of the security processor 800 may be smaller in size than the OS executed in the main processor 710. Furthermore, the CPU 860 may execute a security application processing data that need to be secured. For example, the CPU 860 may execute an application for receiving and processing the password or the passcode of the user, an application for receiving and processing the screen unlock pattern. In other examples, the CPU 860 may execute an electronic payment application for performing an electronic payment or at least a portion of codes (or an applet) of the electronic payment application. By executing the security application, the CPU 860 may compare the input information extracted by the input processing block 860 with the security information 835 stored in the nonvolatile memory device 830 to perform the authentication for the input of the user. For example, the authentication for the input of the user may include screen unlock pattern authentication, password authentication, personal identification number authentication, etc.

For example, if the main processor 710 transmits the input mode signal indicating the secure input mode to the data/control interface 850, or if the security application executed by the CPU 860 determines that data that need to be secured are to be input by the user, the security processor 800 may operate in the secure input mode. In the secure input mode, the input interface 810 may not provide the main processor 710 with the input data ID received from the input device 760. The input processing block 820 may convert the input data ID received via the input interface 810 into a string of numbers, characters and/or symbols as the input information using the mapping table. The CPU 860 may compare the input information extracted by the input processing block 820 with the security information 835 stored in the nonvolatile memory device 830 to perform the authentication for the input of the user. If the input information does not match the security information 835 (e.g., if the input information is different from the security information 835), the authentication for the input of the user may be determined to be failed. If the input information matches the security information 835 (e.g., if the input information is the same as the security information 835), the authentication for the input of the user may be determined to be passed. The security application executed by the CPU 860 may perform subsequent processes based on the result of the authentication for the input of the user. Alternatively, the CPU 860 may provide the result of the authentication to the main processor 710 via the data/control interface 850, and an application executed by the main processor 710 may perform subsequent processes based on the result of the authentication for the input of the user. As described above, in the mobile device 700 according to example embodiments, the security processor 800 may selectively provide the input data ID from the input device 760 to the main processor 710, and may perform the authentication for the input of the user, thereby securing the input of the user.

Figure 8:
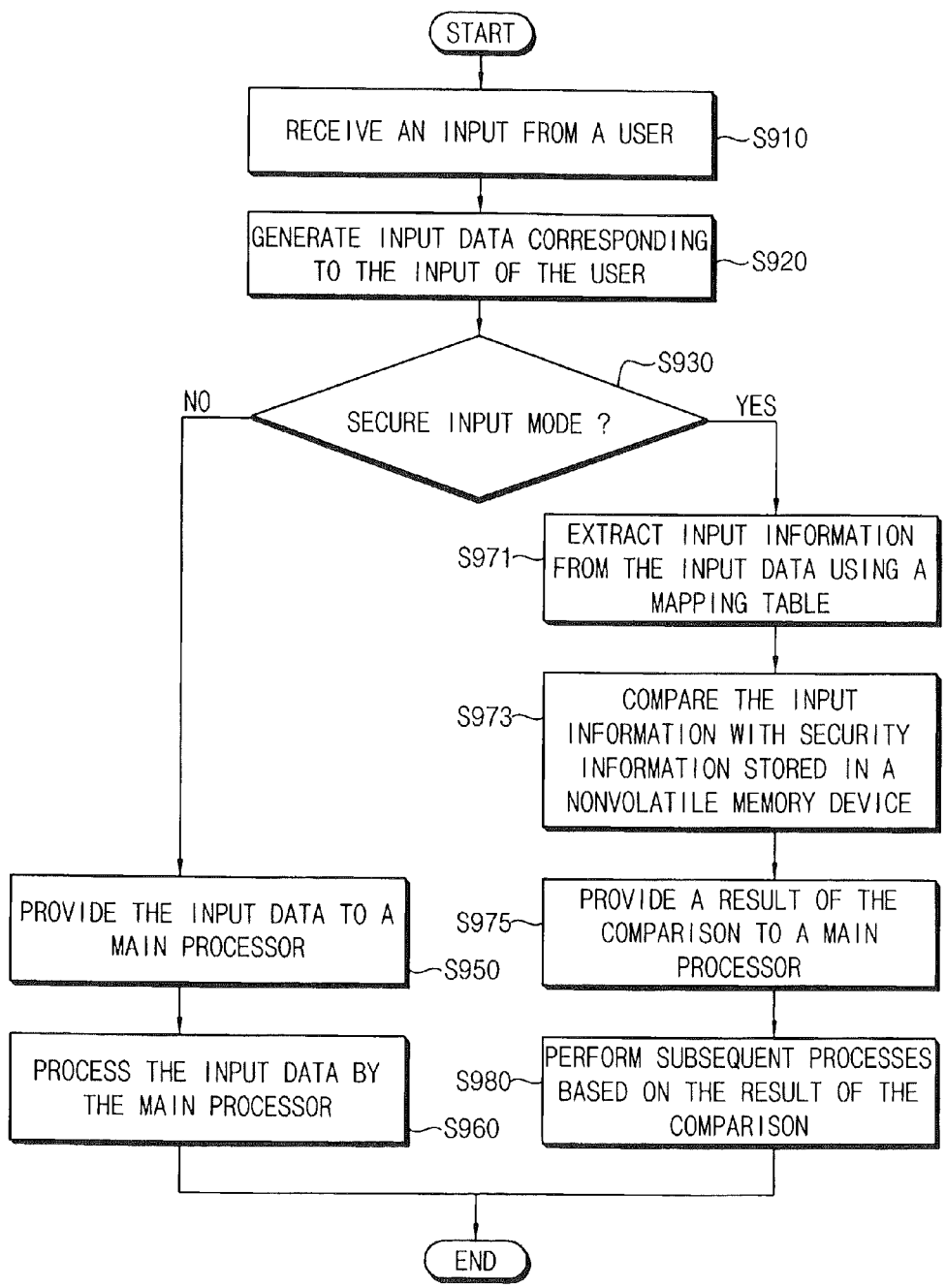
FIG. 8 is a flow chart illustrating a method of processing an input in a mobile device according to example embodiments.

FIG. 8 is a flow chart illustrating a method of processing an input in a mobile device according to example embodiments. Referring to FIGS. 7 and 8, an input device 760 may receive an input from a user (S910), and may generate input data ID corresponding to the input of the user (S920). For example, the touch controller 763 may generate the input data ID including coordinate information about at least one touched point on a touch screen 761. An input interface 810 of a security processor 800 may receive the input data ID from the input device 760. The input interface 810 may selectively output the input data ID to a main processor 710 according to an input mode of a mobile device 700. In some example embodiments, the main processor 710 may determine the input mode based on an input mode signal indicating a normal input mode or a secure input mode, which is received from the main processor 710 via a data/control interface 850. In other example embodiments, an application executed by a CPU 860 of the security processor 800 may determine the start and/or end of the secure input mode. In still other example embodiments, the security processor 800 may determine the start and/or end of the secure input mode by detecting the press of a particular button or by sensing a movement of the mobile device 700.

If the input mode is the normal input mode (S930: NO), the input interface 810 may output the input data ID to the main processor 710 (S950). The main processor 710 may process the input data ID received from the input interface 810 (S960). If the input mode is the secure input mode (S930: YES), an input processing block 820 may extract input information from the input data ID using a mapping table (S971). For example, the input processing block 820 may extract a sting of numbers, characters or symbols or a pattern of connected dots as the input information from the input data ID.

The CPU 860 may compare the input information extracted by the input processing block 820 with security information 835 stored in a nonvolatile memory device 830 (S973). For example, the input of the user may be related to a screen unlock pattern, a password or a personal identification number, and the CPU 860 may perform screen unlock pattern authentication, password authentication or personal identification number authentication by comparing the input information with the security information 835. If the input information does not match the security information 835, the authentication for the input of the user may be determined to be failed, and the mobile device 700 may request the user to enter the input again. If the input information matches the security information 835, the authentication for the input of the user may be determined to be passed.

The security processor 800 may provide a result of the comparison between the input information and the security information 835 to the main processor 710 via the data/control interface 850 (S975), and the main processor 710 may perform subsequent processes based on the result of the comparison received from the data/control interface 850 (S980). For example, if the main processor 710 receives the result indicating that the input information matches the security information 835, the main processor 710 may control a display device of the mobile device 700 to display sensitive data, such as private information. In other example embodiments, the security processor 800 may perform subsequent processes based on the result of the comparison between the input information and the security information 835. For example, the security processor 800 may perform an electronic payment. In other examples, the security processor 800 may generate image data for displaying the sensitive data, and may provide the image data to the main processor 710 to display an image corresponding to the image data.

As described above, in the method of processing the input in the mobile device 700 according to example embodiments, the input data ID may not be provided to the main processor 710, and the authentication for the input of the user may be performed by the security processor 800, so that the input of the user may be secured.

Figure 9:
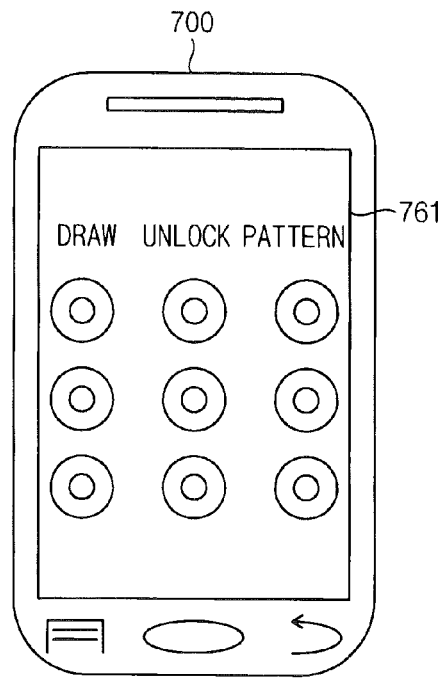
FIG. 9 is a diagram for describing an example of an input processing method of a mobile device of FIG. 7.

FIG. 9 is a diagram for describing an example of an input processing method of a mobile device of FIG. 7. Referring to FIGS. 7 and 9, a mobile device 700 may execute an application that requests a user to enter a screen unlock pattern. For example, when the mobile device 700 is powered on or when a state of the mobile device 700 transitions from a sleep mode to an active mode, the application that requests the user to enter the screen unlock pattern may be executed. In other examples, when private information, such as contact information, an e-mail, a text message, etc., is displayed, the application that requests the user to enter the screen unlock pattern may be executed. While the application that requests the user to enter the screen unlock pattern is executed, the mobile device 700 may operate in a secure input mode.

In some example embodiments, the application that requests the user to enter the screen unlock pattern may be executed by a CPU 860 of a security processor 800. In other example embodiments, among the application that requests the user to enter the screen unlock pattern, a code (or an applet) for controlling a display device may be executed by a main processor 710, and a code (or an applet) for receiving and processing the screen unlock pattern from the user may be executed by the CPU 860 of the security processor 800.

The mobile device 700 may display an image that requests the user to enter the screen unlock pattern, and the user may draw the screen unlock pattern by dragging a finger to connect dots on a touch screen 761. A touch controller 763 may generate input data ID corresponding to a touch (e.g., the drag of the finger) of the user by sensing the touch of the user.

An input interface 810 may receive the input data ID from the touch controller 763, and may not provide the input data ID to the main processor 710 in the secure input mode. An input processing block 820 may receive the input data ID from the touch controller 763 via the input interface 810, and may extract the screen unlock pattern that is input by the user as input information from the input data ID using a mapping table. A nonvolatile memory device 830 may store a predetermined screen unlock pattern as security information 835, and the CPU 860 may compare the screen unlock pattern extracted by the input processing block 820 with the screen unlock pattern stored in the nonvolatile memory device 830.

If the screen unlock pattern extracted by the input processing block 820 (i.e., the screen unlock pattern input by the user) matches the screen unlock pattern stored in the nonvolatile memory device 830, authentication for the screen unlock pattern input by the user may be determined to be passed. Once the authentication for the screen unlock pattern is determined to be passed, the mobile device 700 may be unlocked, or the private information may be displayed.

As described above, the security processor 800 may process the screen unlock pattern that is input by the user, thereby securing the screen unlock pattern.

Figure 10:
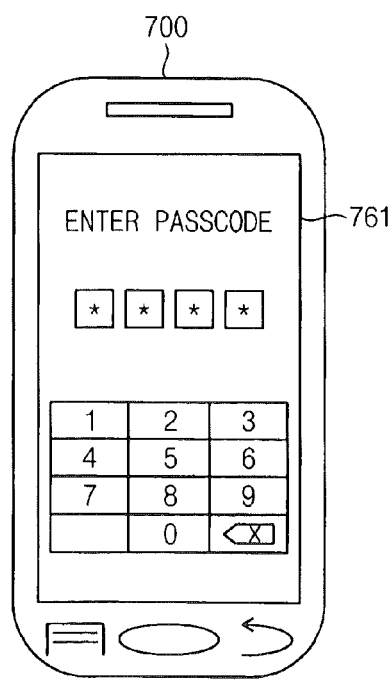
FIG. 10 is a diagram for describing another example of an input processing method of a mobile device of FIG. 7.

FIG. 10 is a diagram for describing another example of an input processing method of a mobile device of FIG. 7.

Referring to FIGS. 7 and 10, a mobile device 700 may execute an application that requests a user to enter a password or a passcode. For example, when the mobile device 700 is powered on or when a state of the mobile device 700 transitions from a sleep mode to an active mode, the application that requests input of the password from the user may be executed. In other examples, when private information, such as contact information, an e-mail, a text message, etc., is displayed, the application requesting the input of the password may be executed. While the application requesting the input of the password is executed, the mobile device 700 may operate in a secure input mode.

In some example embodiments, the application requesting the input of the password may be executed by a CPU 860 of a security processor 800. In other example embodiments, among the application requesting the input of the password, a code (or an applet) for controlling a display device may be executed by a main processor 710, and a code (or an applet) for receiving and processing the password from the user may be executed by the CPU 860 of the security processor 800.

The mobile device 700 may display an image that requests the user to enter the password, and the user may input the password by touching number buttons on a touch screen 761. A touch controller 763 may generate input data ID corresponding to the touch of the user by sensing the touch of the user.

An input interface 810 may receive the input data ID from the touch controller 763, and may not provide the input data ID to the main processor 710 in the secure input mode. An input processing block 820 may receive the input data ID from the touch controller 763 via the input interface 810, and may extract the password that is input by the user as input information from the input data ID using a mapping table. A nonvolatile memory device 830 may store a predetermined password as security information 835, and the CPU 860 may compare the password extracted by the input processing block 820 with the password stored in the nonvolatile memory device 830.

If the password extracted by the input processing block 820 (i.e., the password input by the user) matches the password stored in the nonvolatile memory device 830, authentication for the password input by the user may be determined to be passed. Once the authentication for the password is determined to be passed, the mobile device 700 may be unlocked, or the private information may be displayed.

As described above, the security processor 800 may process the password that is input by the user, thereby securing the password.

Figure 11:
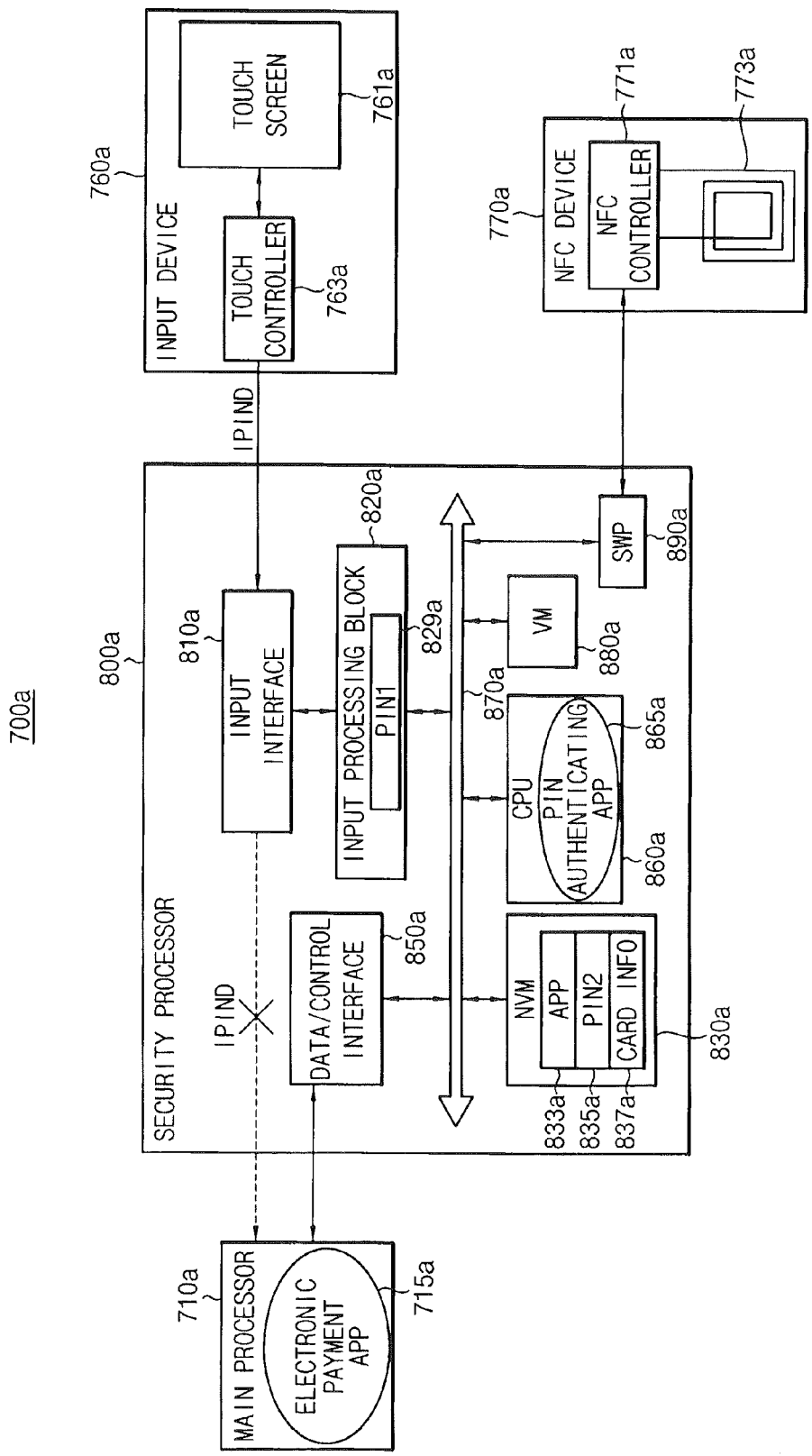
FIG. 11 is a block diagram illustrating a mobile device according to example embodiments.

FIG. 11 is a block diagram illustrating a mobile device according to example embodiments. Referring to FIG. 11, a mobile device 700a includes a main processor 710a, an input device 760a, a communication device 770a and a security processor 800a. The security processor 800a may include an input interface 810a, an input processing block 820a, a nonvolatile memory device 830a, a data/control interface 850a, a CPU 860a, a volatile memory device 880a, a communication device interface 890a and a bus 870a.

The main processor 710a may execute an OS for operating the mobile device 700a and various applications. In some example embodiments, if a user clicks an icon of an electronic payment application 715a, the main processor 710a may execute an electronic payment application 715a. The electronic payment application 715a may request the security processor 800a to provide credit card information, and the security processor 800a may provide a portion of credit card information 837a stored in the nonvolatile memory device 830a to the main processor 710a via the data/control interface 850a. The credit card information provided to the main processor 710a may be information that need not to be secured among the credit card information 837a stored in the nonvolatile memory device 830a. For example, the credit card information provided to the main processor 710a may include a credit card issuer, at least a portion of a credit card number, etc. The electronic payment application 715a may control a display device of the mobile device 700a to display an image requesting the user to select a credit card to be used for an electronic payment based on the credit card information provided from the security processor 800a. If the user selects the credit card to be used for the electronic payment, the electronic payment application 715a may provide information about the selected credit card to the security processor 800a via the data/control interface 850a. In other example embodiments, if the user clicks the icon of the electronic payment application 715a, the electronic payment application 715a may be executed by the security processor 800a.

If the security processor 800a receives the information about the selected credit card from the electronic payment application 715a via the data/control interface 850a, the security processor 800a may execute the personal identification number authenticating application 865a, and may operate in a secure input mode. For example, the CPU 860a of the security processor 800a may load a personal identification number authenticating application 833a stored in the nonvolatile memory device 830a into the volatile memory device 880a operating as a working memory of the CPU 860a, and may execute the personal identification number authenticating application 865a loaded in the volatile memory device 880a. In some example embodiments, once the security processor 800a receives the information about the selected credit card from the electronic payment application 715a, the security processor 800a may not provide input data from a touch controller 763a to the main processor 710a. That is, the security processor 800a may not receive an additional input mode signal from the main processor 710a, and may operate in the secure input mode in response to the information about the selected credit card from the electronic payment application 715a.

The personal identification number authenticating application 865a may control the mobile device 700a to receive the personal identification number from the user. For example, the personal identification number authenticating application 865a may generate image data for requesting input of the personal identification number from the user, and may provide the image data to the main processor 810 via the data/control interface 850a. The main processor 710a may control the display device to display an image corresponding to the image data. If the image requesting the user to enter the personal identification number is displayed, the user may input the personal identification number by touching number buttons on a touch screen 761a, and a touch controller 763a may generate input data IPIND about the personal identification number that is input by the user.

The input interface 810a of the security processor 800a may receive the input data IPIND about the personal identification number from the touch controller 763a, and may not provide the input data IPIND to the main processor 710a. In some example embodiments, the security processor 800a may provide the main processor 710a with predetermined data having a predetermined value instead of the input data IPIND. In other example embodiments, the security processor 800a may provide the main processor 710a with no input.

The input processing block 820a may receive the input data IPIND about the personal identification number from the touch controller 763a via the input interface 810a. A mapping table of the input processing block 820a may store mapping information including a number corresponding to each point of the touch screen 761a, and the input processing block 820a may extract a first personal identification number 829a that is input by the user as input information from the input data IPIND based on the mapping information stored in the mapping table. Thus, the personal identification number authenticating application 865a may receive the first personal identification number 829a from the user.

The nonvolatile memory device 830a may store a predetermined second personal identification number 835a, and the personal identification number authenticating application 865a may perform authentication for the personal identification number that is input by the user by comparing the first personal identification number 829a extracted by the input processing block 820a with the second personal identification number 835a stored in the nonvolatile memory device 830a. If the first personal identification number 829a does not match the second personal identification number 835a, the authentication for the personal identification number may be determined to be failed, and the personal identification number authenticating application 865a may request the user to enter the personal identification number again. Further, if the number of failures of the authentication exceeds a predetermined number, the personal identification number authenticating application 865a may inform the electronic payment application 715a executed by the main processor 710a of the failure of the authentication for the personal identification number via the data/control interface 850a.

If the first personal identification number 829a matches the second personal identification number 835a, the personal identification number authenticating application 865a may generate payment information based on the credit card information 837a stored in the nonvolatile memory device 830a, and provide the payment information to the communication device 770a via the communication device interface 890a. The payment information may include information that needs to be secured among the credit card information 837a stored in the nonvolatile memory device 830a. For example, the payment information may include a credit card issuer, a credit card number, an expiration date, a card verification code (CVC), a customer information, etc. with respect to the selected credit card. The communication device interface 890a may perform communication between the security processor 800a and the communication device 770a. In some example embodiments, the communication device interface 890a may be a single wire protocol (SWP) interface.

The communication device 770a may perform wired or wireless communication with an external electronic payment reader to provide the payment information from the security processor 800a to the external electronic payment reader. In some example embodiments, the communication device 770a may be a near field communication (NFC) device. For example, the communication device 770a is the NFC device, the external electronic payment reader is an NFC reader, and the NFC device may perform the near field communication as a client with the NFC read that is a host. The communication device 770a may include an antenna 773a for transmitting/receiving a wireless signal, and an NFC controller 771a for controlling the antenna 773a. For example, the antenna 773a may be a loop antenna. Once the communication device 770a provides the payment information to the external electronic payment reader, the personal identification number authenticating application 865a may inform, via the data/control interface 850a, the electronic payment application 715a that the payment information is provided.

The external electronic payment reader may provide the payment information to a remote electronic payment server, and the remote electronic payment server may process the electronic payment based on the payment information. The remote electronic payment server may provide a result of the electronic payment to the electronic payment reader. The electronic payment reader may print out the result of the electronic payment, or may provide the result of the electronic payment to the communication device 770a using near field communication techniques.

As described above, in the mobile device 700a according to example embodiments, the security processor 800a may perform the authentication for the personal identification number input by the user, may store the credit card information 837a, and may provide the payment information generated based on the stored credit card information 837a to the external electronic payment reader via the communication device 770a, thereby securing the personal identification number, the credit card information and the payment information.

Referring still to FIG. 11, an energy induction device (e.g., the antenna 773a) within the mobile device 700a (e.g., a handheld wireless communications device) may be configured to power the illustrated elements, including the security processor 800a. The internal NFC controller 770a may also be configured to support inductive charging of the energy induction device from an electromagnetic field generated external to the handheld wireless communications device. The security processor 800a, which is configured to support a financial transaction responsive to data input to the input device 760a, may use the energy induction device to power transfer of financial data between the security processor 800a and an external near field communications (NFC) reader (e.g., an electronic payment reader 780a illustrated in FIG. 13D), which is wirelessly coupled to the handheld wireless communications device. This wireless data transfer may utilize the communication interface circuit 890a, which may be a single wire protocol (SWP) interface, and the internal NFC controller 770a, which is electromagnetically coupled to the external near field communications (NFC) reader. The internal NFC controller 770a and external NFC reader may be configured to cooperatively communicate with each other (via electromagnetic fields) during the transfer of financial data from the security processor 800a to the external NFC reader. Moreover, the external NFC reader may be configured to generate electromagnetic fields utilized by internal NFC controller 770a to inductively charge the energy induction device within the mobile device 700a concurrently with the transfer of financial data from the security processor 800a to the internal NFC controller 770a. In this manner, the external near field communications reader may be configured to generate electromagnetic fields utilized by the internal NFC controller 770a and the communication interface circuit 890a to thereby inductively charge the energy induction device for a sufficient duration to power the transfer of financial data from the security processor 800a to the external near field communications reader.

FIG. 12 is a flow chart illustrating an electronic payment method using a mobile device according to example embodiments. FIGS. 13A through 13D are diagrams for describing an example of an electronic payment method using a mobile device. Referring to FIGS. 11, 12, 13A, 13B, 13C and 13D, if a user clicks an icon of an electronic payment application, the electronic payment application may be executed. In some example embodiments, a main processor 710a may execute the electronic payment application 715a. The electronic payment application 715a may request a security processor 800a to provide credit card information, and the security processor 800a may provide a portion of credit card information 837a stored in a nonvolatile memory device 770a to the main processor 710a via a data/control interface 850a. In other example embodiments, the security processor 800a may execute the electronic payment application 715a.

Figure 13A:
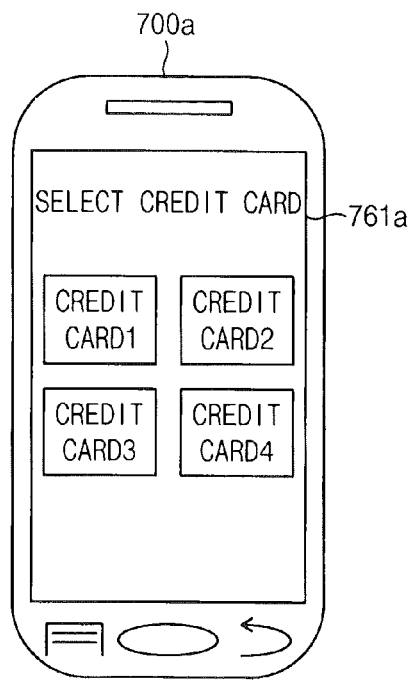
FIGS. 13A through 13D are diagrams for describing an example of an electronic payment method using a mobile device.

As illustrated in FIG. 13A, the electronic payment application 715a may request the user to select a credit card to be used for an electronic payment (S1015). For example, the electronic payment application 715a may generate an image requesting the user to select the credit card to be used for the electronic payment based on the credit card information provided from the security processor 800a, and may control the display device to display the generated image. If the image requesting the user to select the credit card is displayed, the user may select the credit card to be used for the electronic payment, and the electronic payment application 715a may receive the selection of the credit card from the user.

If the electronic payment application 715a receives the selection of the credit card, the electronic payment application 715a may provide information about the selected credit card to the security processor 800a (S1020). The security processor 800a may receive the information about the selected credit card from the electronic payment application 715a via the data/control interface 850a. If the security processor 800a receives the information about the selected credit card from the electronic payment application 715a, the security processor 800a may execute a personal identification number authenticating application 865a, and may operate in a secure input mode (S1025). For example, in response to the information about the selected credit card, a CPU 860a of the security processor 800a may load a personal identification number authenticating application 833a stored in a nonvolatile memory device 830a into a volatile memory device 880a, and may execute the loaded personal identification number authenticating application 865a. Further, once the security processor 800a receives the information about the selected credit card from the electronic payment application 715a, the security processor 800a may not provide input data from a touch controller 763a to the main processor 710a. That is, the security processor 800a may not receive an additional input mode signal from the main processor 710a, and may operate in the secure input mode in response to the information about the selected credit card from the electronic payment application 715a.

The personal identification number authenticating application 865a may request the user to enter a personal identification number. For example, the personal identification number authenticating application 865a may generate image data requesting input of the personal identification number from the user, and may provide the image data to the main processor 710a via the data/control interface 850a. The main processor 710a may control the display device to display an image requesting the user to enter the personal identification number based on the image data.

Figure 13B:
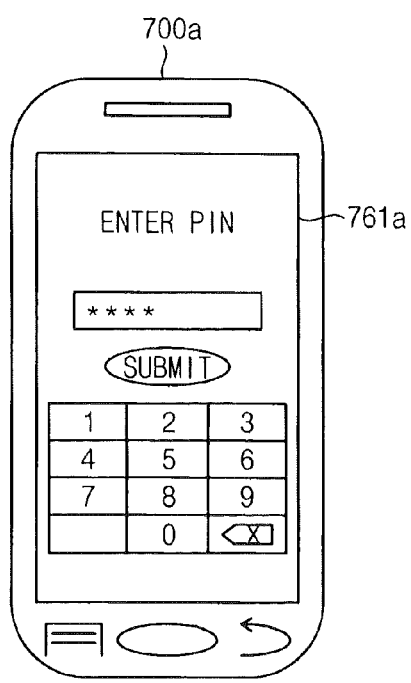

As illustrated in FIG. 13B, if the image requesting the input of the personal identification number is displayed, the user may input a first personal identification number by touching number buttons on a touch screen 761a, and the security processor 800a may receive the first personal identification number that is input by the user (S1030).

Figure 13C:
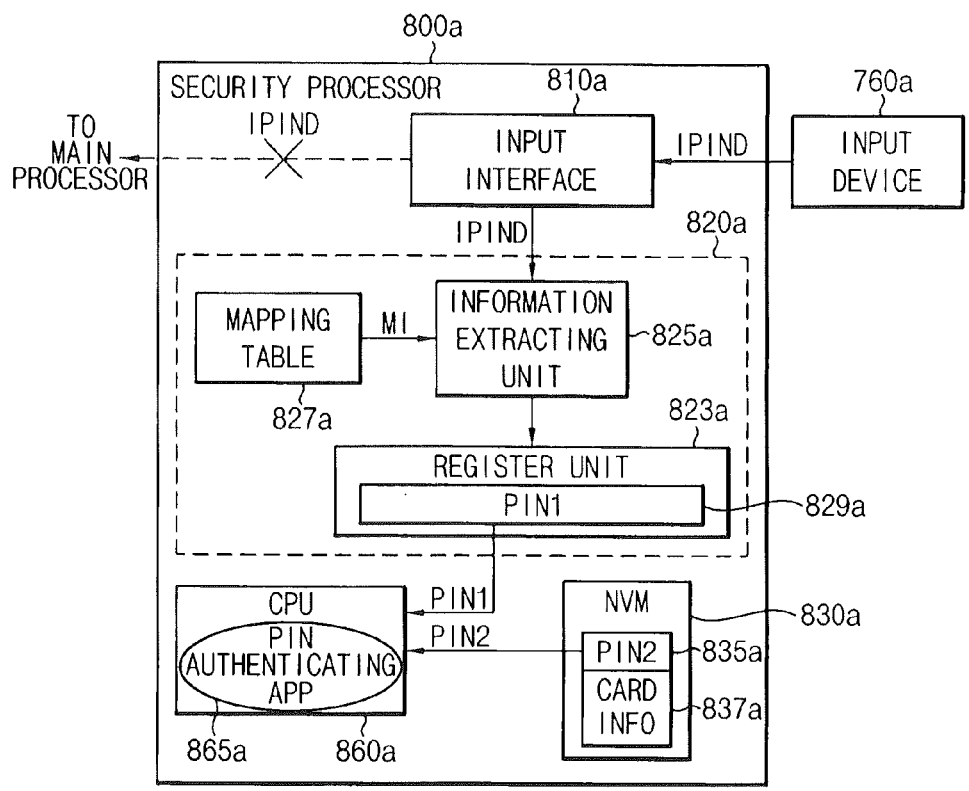

As illustrated in FIG. 13C, if the user touches the number buttons on the touch screen 761a, the touch controller 763a may generate input data IPIND corresponding to the touch of the user. Since the security processor 800a operates in the secure input mode, an input interface 810a of the security processor 800a may provide the main processor 710a with predetermined data representing a predetermined number, character or symbol instead of the input data IPIND. Alternatively, the input interface 810a may provide the main processor 710a with no input. A mapping table 827a of an input processing block 820a may store mapping information MI including a number corresponding to each point on the touch screen 761a, and an information extracting unit 825a of the input processing block 820a may extract the first personal identification number from the input data IPIND based on the mapping information MI stored in the mapping table 827a. The first personal identification number extracted by the information extracting unit 825a may be stored in a register unit 823a of the input processing block 820a. The personal identification number authenticating application 865a may compare the first personal identification number 829a stored in the register unit 823a with a predetermined second personal identification number 835a stored in the nonvolatile memory device 830a (S1040).

If the first personal identification number 829a does not match the second personal identification number 835a (S1050: NO), the personal identification number authenticating application 865a may request the user to enter the first personal identification number again (S1060: NO, S1030). If the number of times that the user enters the wrong personal identification number is greater than a predetermined number (S1060: YES), the personal identification number authenticating application 865a may inform the electronic payment application 715a of the failure of authentication for the personal identification number, and the electronic payment application 715a may control the display device to display that the electronic payment fails (S1070).

If the first personal identification number 829a matches the second personal identification number 835a (S1050: YES), the personal identification number authenticating application 865a may inform the electronic payment application 715a of the success of the authentication for the personal identification number, and the electronic payment application 715a may control the display device to display that the authentication for the personal identification number succeeds. Further, the personal identification number authenticating application 865a may generate payment information based on the credit card information 837a stored in the nonvolatile memory device 830a. The payment information may include information that needs to be secured among the credit card information 837a stored in the nonvolatile memory device 830a. For example, the payment information may include a credit card issuer, a credit card number, an expiration date, a card verification code (CVC), a customer information, etc. with respect to the selected credit card.

Figure 13D:
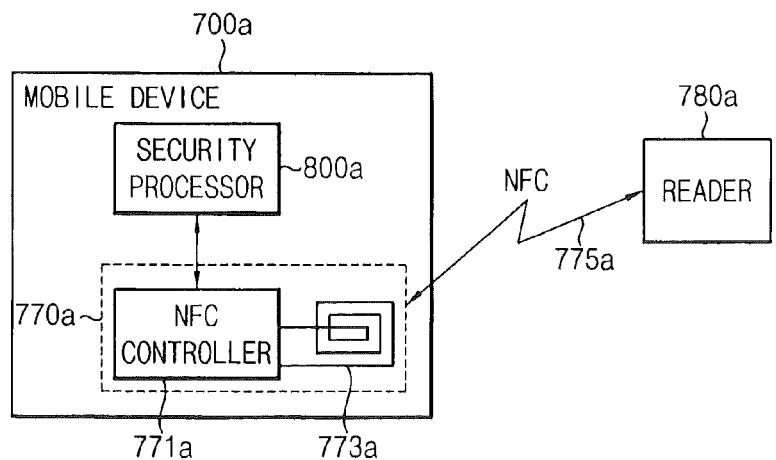

If the success of the authentication for the personal identification number is displayed, as illustrated in FIG. 13D, the user may hold the mobile device 700a close to an electronic payment reader 780a (S1080). If the mobile device 700a is placed close to the electronic payment reader 780a, the security processor 800a may provide the payment information to the electronic payment reader 780a via a communication device 770a (S1090). The personal identification number authenticating application 865a may provide the payment information to an NFC controller 771a of the communication device 770a, and the NFC controller 771a may provide the payment information to the electronic payment reader 780a via the antenna 773a and an NFC communication channel 775a.

If the payment information is provided to the electronic payment reader 780a, the personal identification number authenticating application 865a may inform the electronic payment application 715a of the success of the electronic payment via the data/control interface 850a, and the electronic payment application 715a may control the display device to display that the electronic payment succeeds.

As described above, in the electronic payment method using the mobile device 700a according to example embodiments, the security processor 800a may perform the authentication for the personal identification number that is input by the user, may store the credit card information 837a, and may provide the payment information generated based on the stored credit card information 837a to the external electronic payment reader 780a via the communication device 770a, thereby securing the personal identification number, the credit card information and the payment information.

Figure 14:
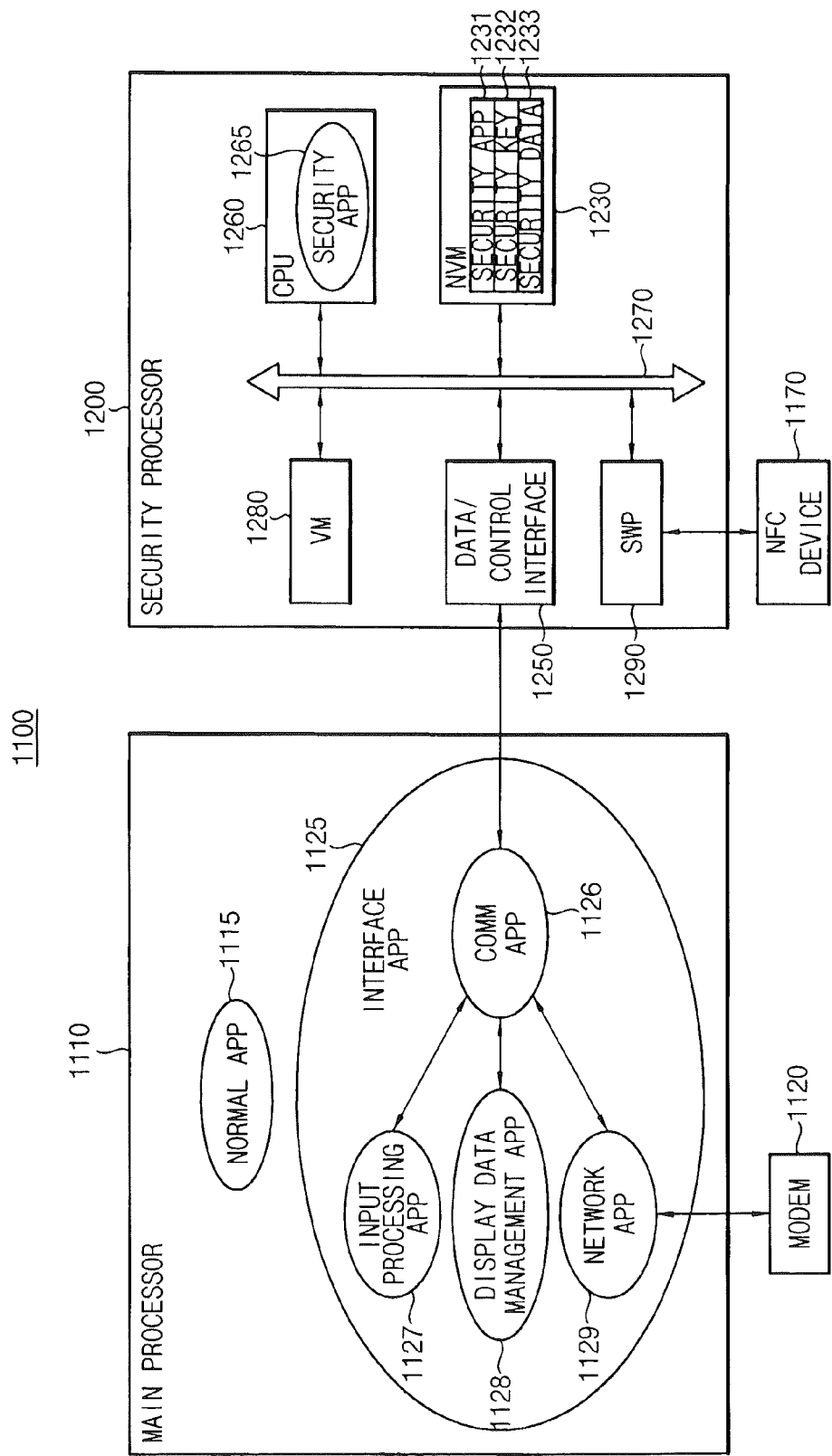
FIG. 14 is a block diagram illustrating a mobile device according to example embodiments.

FIG. 14 is a block diagram illustrating a mobile device according to example embodiments. Referring to FIG. 14, a mobile device 1100 includes a main processor 1110, a modem 1120, a communication device 1170 and a security processor 1200. The security processor 1200 may include a data/control interface 1250, a nonvolatile memory device 1230, a CPU 1260, a volatile memory device 1280, a communication device interface 1290 and a bus 1270. The main processor 1110 may execute a normal application 1115 processing normal data, and the security processor 1200 may execute a security application 1265 processing sensitive data that need to be secured. Further, the main processor 1110 may execute an interface application 1125 for interfacing with the security application 1265 executed by the security processor 1200.

For example, the interface application 1125 may include a communication application 1126, an input processing application 1127, a display data management application 1128 and a network application 1129. The communication application 1126 may request the security processor 1200 to execute the security application 1265 via the data/control interface 1250, and may performs data transfer with the security processor 1200 via the data/control interface 1250. The input processing application 1127 may process an input of a user, such as a touch, a press of a button, etc. The display data management application 1128 may control a display device of the mobile device 1100 to display an image based on image data received from the security application 1265. The network application 1129 may control the modem 1120 to provide data received from the security application 1265 to an external device through a wired or wireless communication channel.

The security processor 1200 may receive the request for executing the security application 1265 from the main processor 1110 via the data/control interface 1250. If the request for executing the security application 1265 is received, the CPU 1260 may load a security application 1231 stored in the nonvolatile memory device 1230 into the volatile memory device 1280, and may execute the security application 1265 loaded into the volatile memory device 1280. Further, the nonvolatile memory device 1230 may store a security key 1232 used to encrypt/decrypt data, and a security data 1233 such as private information. The security application 1231, the security key 1232 and the security data 1233 may be stored in the nonvolatile memory device 1230 of the security processor 1200, and the security application 1265 processing the security data 1233 may be executed by the CPU 1260 of the security processor 1200. Accordingly, the security application 1231, the security key 1232 and the security data 1233 may be secured.

For example, an application authenticating a personal identification number as the security application 1265 may be executed by the CPU 1260 of the security processor 1200. The application may compare a personal identification number input by a user with a personal identification number stored in the nonvolatile memory device 1230. If the personal identification number input by the user matches the personal identification number stored in the nonvolatile memory device 1230, the application may generate payment information based on the security data 1233 stored in the nonvolatile memory device 1230. The application may provide the payment information to the communication device 1170 via the communication device interface 1290, and the communication device 1170 may provide the payment information to an external electronic payment reader through an NFC communication channel. As described above, in the mobile device according to example embodiments, since the security application 1265 is executed by the security processor 1200, the security application 1265 and the security data 1233 processed by the security application 1265 may be secured.

Figure 15:
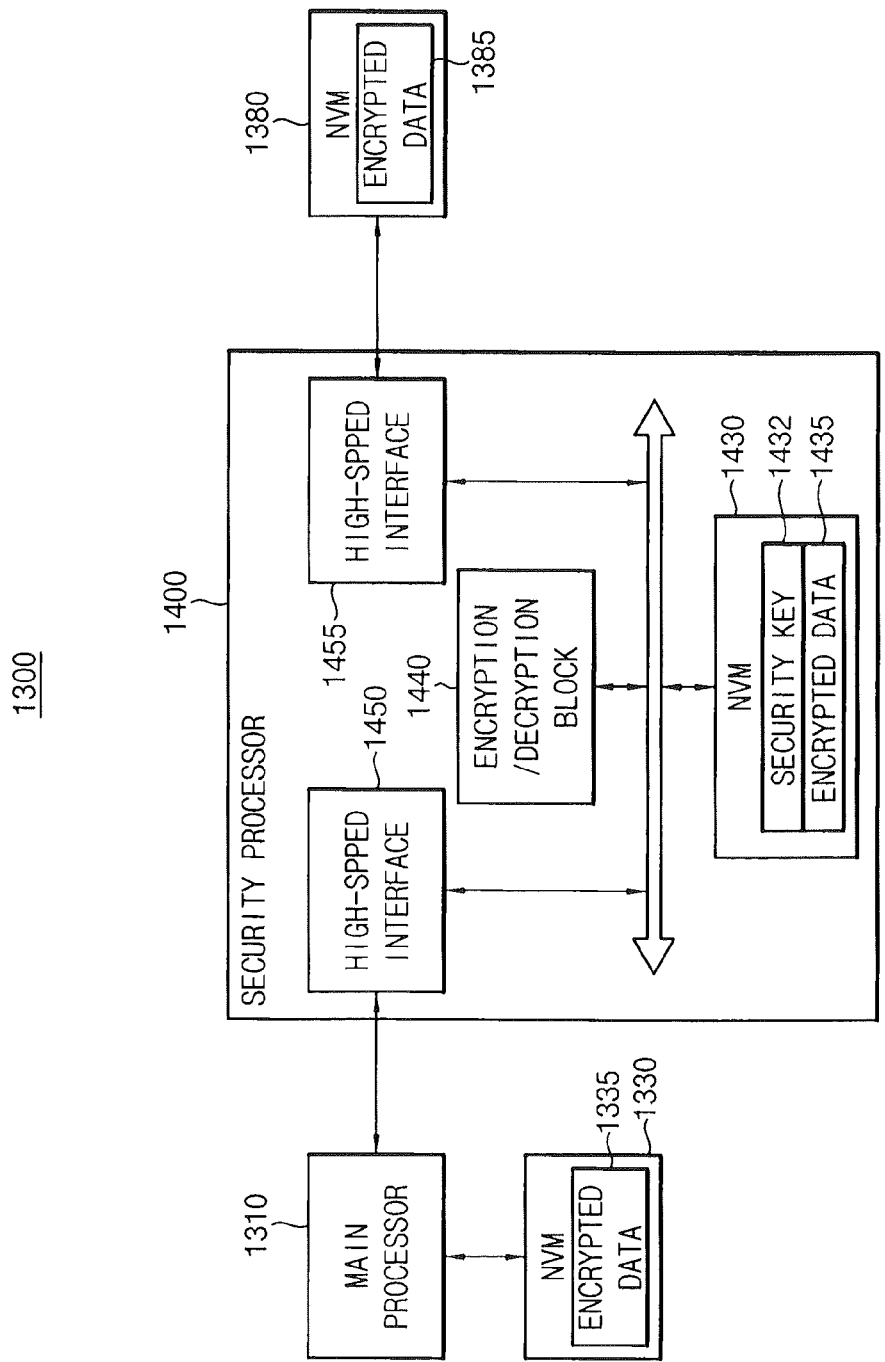
FIG. 15 is a block diagram illustrating a mobile device according to example embodiments.

FIG. 15 is a block diagram illustrating a mobile device according to example embodiments. Referring to FIG. 15, a mobile device 1300 includes a main processor 1310, a first external nonvolatile memory device 1330 and a security processor 1400. The security processor 1400 may include a nonvolatile memory device 1430, an encryption/decryption block 1440 and a first high-speed interface 1450. The main processor 1310 may request the security processor 1400 to encrypt data. The security processor 1400 may receive the data to be encrypted from the main processor 1310 via the first high-speed interface 1450. The encryption/decryption block 1440 of the security processor 1400 may encrypt the data received via the first high-speed interface 1450 using a security key 1432 stored in the nonvolatile memory device 1430.

In some example embodiments, the data encrypted by the encryption/decryption block 1440 may be provided to the main processor 1310 via the first high-speed interface 1450, and the main processor 1310 may store the encrypted data 1335 in the first external nonvolatile memory device 1330. In other example embodiments, the mobile device 1300 may further include a second external nonvolatile memory device 1380 coupled to the security processor 1400, and the security processor 1400 may further include a second high-speed interface 1455 for interfacing with the second external nonvolatile memory device 1380. The security processor 1400 may provide the data encrypted by the encryption/decryption block 1440 to the second external nonvolatile memory device 1380 via the second high-speed interface 1455, and the encrypted data 1385 may be stored in the second external nonvolatile memory device 1380. In still other example embodiments, the security processor 1400 may store the encrypted data 1435 in the nonvolatile memory device 1430 of the security processor 1400. As described above, in the mobile device 1300 according to example embodiments, the security processor 1400 may encrypt the data using the security key 1432 stored in the nonvolatile memory device 1430, thereby securing the data.

Figure 16:
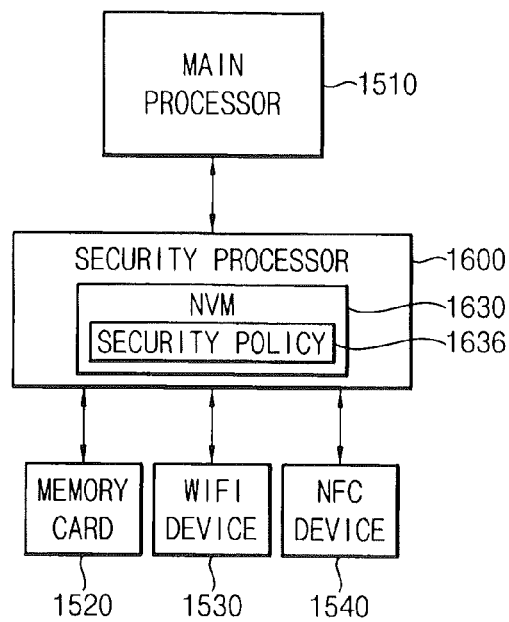
FIG. 16 is a block diagram illustrating a mobile device according to example embodiments.

FIG. 16 is a block diagram illustrating a mobile device according to example embodiments. Referring to FIG. 16, a mobile device 1500 includes a main processor 1510, a memory card 1520, a Wi-Fi device 1530, an NFC device 1540 and a security processor 1600. The security processor 1600 may store a security policy 1636 in a nonvolatile memory device 1630, and a data access may be permitted or blocked based on the security policy 1636 stored in the nonvolatile memory device 1630. In some example embodiments, the nonvolatile memory device 1630 of the security processor 1600 may store sensitive data, such as private information, confidential information, company information, etc., and an access to the sensitive data may be permitted or blocked based on the security policy 1636 stored in the nonvolatile memory device 1630. In other example embodiments, an access to sensitive data stored in the memory card 1520 may be permitted or blocked based on the security policy 1636 stored in the nonvolatile memory device 1630. In still other example embodiments, an internet access using the Wi-Fi device 1530 may be permitted or blocked based on the security policy 1636 stored in the nonvolatile memory device 1630. In still other example embodiments, when the mobile device 1500 is placed close to an entrance/exit control device, the mobile device 1500 may perform communication with the entrance/exit control device via the NFC device 1540. The mobile device 1500 may transmit security level data corresponding to the security policy 1636 to the entrance/exit control device via the NFC device 1540, and the entrance/exit control device may permit or block the entrance/exit of a user according to the security level data. While the mobile device 1500 performs the communication with the entrance/exit control device via the NFC device 1540, the mobile device 1500 may operate in a sleep mode, the main processor 1510 may not be supplied with power, and the security processor 1600 may be supplied with power from the entrance/exit control device via the NFC device 1540. As described above, in the mobile device 1500 according to example embodiments, the data access may be controlled based on the security policy 1636 stored in the nonvolatile memory device 1630 of the security processor 1600, thereby securing the data.

Figure 17:
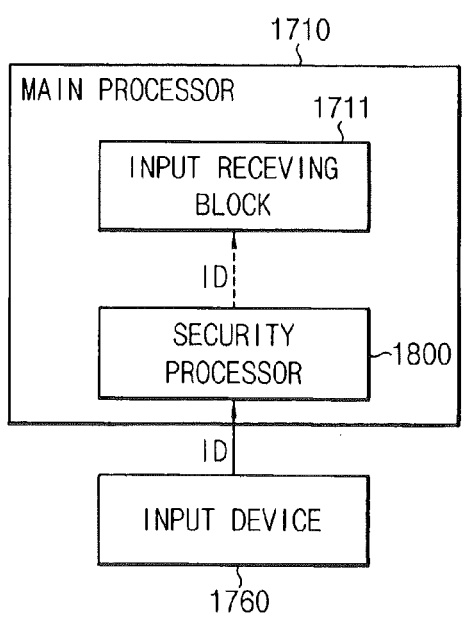
FIG. 17 is a block diagram illustrating a mobile device according to example embodiments.

FIG. 17 is a block diagram illustrating a mobile device according to example embodiments. Referring to FIG. 17, a mobile device 1700 includes a main processor 1710 and an input device 1760. The input device 1760 may receive an input of a user, and may generate input data ID corresponding to the input of the user. In some example embodiments, the input device 1760 may include a touch screen, a key pad, a button, a fingerprint device, a keyboard, a mouse, or the like. The main processor 1710 may include an input receiving block 1711 and a security processor 1800. The input receiving block 1711 may be a block included in a typical main processor to receive the input data ID from the input device 1760. The security processor 1710 may be implemented as a processing block included in the main processor 1710, and may be coupled between the input receiving block 1711 of the main processor 1710 and the input device 1760. The security processor 1800 may receive the input data ID from the input device 1760, and may selectively provide the input data ID to the input receiving block 1711 of the main processor 1710 according to an input mode of the mobile device 1700. For example, the security processor 1800 may not provide the input data ID received from the input device 1760 to the input receiving block 1711 of the main processor 1710 in a secure input mode. Accordingly, even if the main processor 1710 is hacked, the input of the user may be secured. Further, the security processor 1800 may execute a security application processing data that need to be secured, and may encrypt the data that need to be secured to store the encrypted data. Thus, the security processor 1800 may perform a secure user input function, a secure execution function and/or a secure storage function.

According to example embodiments, the mobile device 1700 may be any mobile device, such as a mobile phone, a smart phone, a tablet computer, a laptop computer, a personal digital assistant (PDA), a portable multimedia player (PMP), a digital camera, a music player, a portable gate console, a navigation system, etc. The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

What is claimed is:

1. A handheld wireless communications device, comprising:
   a data input device configured to receive first input data provided by a user;
   a main processor; and
   a security processor, comprising:
      an input interface and input processing block configured to extract second data from a first portion of the first input data using a data mapping operation;
      an encryption circuit configured to generate secure data from the extracted second data by encrypting the extracted second data using an encryption key; and
      a data/control interface configured to transfer the secure data to the main processor;
      wherein said security processor is configured to independently determine the timing of a start and/or end of a secure input mode by an application executed therein in the absence of an instruction or request from said main processor, said secure input mode supporting operations by said encryption circuit to encrypt the extracted second data so that it is not decipherable by said main processor.

2. The device of claim 1, further comprising a controller configured to receive the first input data from said data input device; and wherein the input interface and input processing block is further configured to support bidirectional communication of unencrypted data between said main processor and the controller.

3. The device of claim 2, wherein said security processor comprises a synchronizer configured to provide the touch screen controller with a second clock signal in response to a first clock signal generated by said main processor.

4. The device of claim 2, wherein the input interface and input processing block comprises:
   an input buffer configured to support a queue of first input data received from the touch screen controller;
   an information extracting circuit configured to receive the first input data from said input buffer; and
   a state machine configured to control extraction of the second data from the first input data within the information extracting circuit using operations that are free of control from said main processor.

5. The device of claim 1, wherein the data mapping operation includes using mapping information derived from a mapping table to determine how the second data is to be extracted from the first portion of the input data.

6. The device of claim 5, wherein said security processor further comprises a nonvolatile memory; and wherein the mapping table is stored in the nonvolatile memory.

7. The device of claim 1, wherein said security processor is an application specific integrated circuit configured to support a finite set of security functions that cannot be modified by said main processor.

8. The device of claim 1, wherein said security processor is an application specific integrated circuit having an operating system that cannot be modified by said main processor.

9. The device of claim 1, wherein said security processor is configured to store a security key; and wherein the encryption key is derived from the security key using a key derivation operation.

10. The device of claim 1, wherein said main processor is configured to request authentication of the secure data in response to transferring the secure data to a remote device via a wireless channel.

11. The device of claim 1, wherein the extracted second data includes at least one of an internet banking password, a user identification and a personal identification number; and wherein said encryption circuit is configured to support a financial transaction by generating the secure data as an encrypted digital signature containing financial transaction information.

12. The device of claim 11, wherein said main processor is configured to seek verification of the financial transaction by transmitting the encrypted digital signature to a remote internet banking server via a wireless channel; and wherein said main processor is configured to receive a result of the verification of the financial transaction from the wireless channel and pass the result of the verification to said security processor.

13. A handheld wireless communications device, comprising:
- a data input device configured to receive first input data provided by a user;
- a main processor; and
- a security processor, comprising:
  - an input interface and input processing block configured to extract second data from a first portion of the first input data using a data mapping operation;
  - a nonvolatile memory device configured to store security information; and
  - a processing unit configured to authenticate the first portion of the first input data by comparing the second data to the security information to thereby determine a match there between;
- wherein said security processor is configured to independently determine the timing of a start and/or end of a secure input mode by an application executed therein in the absence of an instruction or request from said main processor, said secure input mode supporting operations by said processing unit to authenticate the first portion of the first input data.

14. The device of claim 13, wherein said security processor further comprises a data/control interface configured to provide the main processor with a result of the authentication performed by the processing unit.

15. A handheld wireless communications device, comprising:
- a data input device configured to receive first input data provided by a user;
- a security processor electrically coupled to said data input device, said security processor comprising:
  - an input interface and input processing block configured to extract first personal identification information from a first portion of the first input data;
  - a nonvolatile memory device configured to store second personal identification information and financial transaction payment information therein; and
  - a processing unit configured to authenticate the extracted first personal identification information by comparing the first personal identification information to the second personal identification information to thereby determine a match there between and further configured to transfer the financial transaction payment information to a communication device interface within the device in response to the determination of the match; and
- a main processor electrically coupled to said security processor in a manner that precludes direct communication of data and control signals between said data input device and said main processor; and
- wherein said security processor is configured to independently determine the timing of a start and/or end of a secure input mode by an application executed therein in the absence of an instruction or request from said main processor, said secure input mode supporting operations by said processing unit to authenticate the extracted first personal identification information.

16. The device of claim 15, wherein the input interface and input processing block is configured to extract the first personal identification information from the first portion of the first input data using a data mapping operation and mapping data provided by a mapping table within said security processor.

17. The device of claim 16, wherein the input interface and input processing block comprises:
- an input buffer configured to support a queue of the first input data;
- an information extracting circuit configured to receive the first input data from said input buffer; and
- a state machine configured to control extraction of the first personal identification information from the first input data within the information extracting circuit.

18. The device of claim 15, wherein the communication device interface is configured to convert the financial transaction payment information to a format compatible with transmission or reading by a near field communication (NFC) device.

19. The device of claim 15, wherein the processing unit is configured to authenticate the extracted first personal identification information using a personal identification number (PIN) authenticating application stored therein.

\* \* \* \* \*